United States Patent
Suzuki et al.

(10) Patent No.: US 12,403,524 B2
(45) Date of Patent: Sep. 2, 2025

(54) METHOD OF MANUFACTURING PRESS-FORMED PRODUCT, AND TRAY AND HOT-PRESS MANUFACTURING LINE USED FOR MANUFACTURING PRESS-FORMED PRODUCT

(71) Applicant: NIPPON STEEL CORPORATION, Tokyo (JP)

(72) Inventors: Toshiya Suzuki, Tokyo (JP); Naruhiko Nomura, Tokyo (JP); Koichi Hamada, Tokyo (JP); Yujiro Tatsumi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 309 days.

(21) Appl. No.: 18/042,636

(22) PCT Filed: Aug. 23, 2021

(86) PCT No.: PCT/JP2021/030780
§ 371 (c)(1),
(2) Date: Feb. 23, 2023

(87) PCT Pub. No.: WO2022/045056
PCT Pub. Date: Mar. 3, 2022

(65) Prior Publication Data
US 2023/0356282 A1    Nov. 9, 2023

(30) Foreign Application Priority Data
Aug. 28, 2020 (JP) .................................. 2020-145074

(51) Int. Cl.
*B21D 43/02* (2006.01)
*B21D 22/02* (2006.01)
(Continued)

(52) U.S. Cl.
CPC ............. *B21D 43/02* (2013.01); *B21D 22/26* (2013.01); *B21D 39/03* (2013.01)

(58) Field of Classification Search
CPC ...... B21D 43/02; B21D 43/105; B21D 43/11; B21D 22/26; B21D 22/022; B21D 22/208;
(Continued)

(56) References Cited

U.S. PATENT DOCUMENTS

2022/0168792 A1 *   6/2022   Cheng ..................... C21D 7/13

FOREIGN PATENT DOCUMENTS

| CN | 105195585 B | * | 6/2017 | |
| CN | 110961514 A | * | 4/2020 | ........... B21D 22/022 |

(Continued)

OTHER PUBLICATIONS

English translate (CN110961514A), rederived date Mar. 31, 2025.*
(Continued)

*Primary Examiner* — Mohammed S. Alawadi
(74) *Attorney, Agent, or Firm* — Greer, Burns & Crain, Ltd.

(57) ABSTRACT

A method of manufacturing a press-formed product includes a heating step, a transportation step, and a pressing step. At the heating step, workpieces are heated while a first workpiece W1 is placed on a first group of struts 3 extending upward from a tray body 2, and a second workpiece W2 is placed on a second group of struts 3 to be located above the first workpiece W1 and overlap it. At the transportation step, the second workpiece W2, while located above the first workpiece W1 and overlapping it, is transported, together with the tray body 2, from the heating device 14 to the lifting location. At the lifting location, the second workpiece W2 is lifted upward by the transportation device 46 and the first workpiece W1 is lifted by the transportation device 46
(Continued)

before they are transported to their respective pressing locations.

11 Claims, 18 Drawing Sheets

(51) Int. Cl.

| | | |
|---|---|---|
| *B21D 22/20* | (2006.01) | |
| *B21D 22/26* | (2006.01) | |
| *B21D 39/03* | (2006.01) | |
| *B21D 43/10* | (2006.01) | |
| *B21D 43/11* | (2006.01) | |
| *B30B 15/30* | (2006.01) | |
| *B30B 15/34* | (2006.01) | |
| *C21D 1/673* | (2006.01) | |
| *C21D 8/00* | (2006.01) | |
| *C21D 9/00* | (2006.01) | |
| *C21D 9/46* | (2006.01) | |
| *C21D 11/00* | (2006.01) | |
| *F27D 5/00* | (2006.01) | |

(58) Field of Classification Search
CPC ......... B21D 39/03; B30B 15/30; B30B 15/34; C21D 1/673; C21D 8/005; C21D 9/0018; C21D 9/0025; C21D 9/0056; C21D 9/0062; C21D 9/0068; C21D 9/46; C21D 11/00; F27D 5/0006; Y02P 10/25

See application file for complete search history.

(56) References Cited

FOREIGN PATENT DOCUMENTS

| | | | |
|---|---|---|---|
| DE | 20319600 U1 | | 3/2004 |
| JP | 4673656 B2 | | 1/2011 |
| JP | 5814669 B2 | | 10/2015 |
| JP | 5910305 B2 | | 4/2016 |
| JP | 5910306 B2 | | 4/2016 |
| KR | 101490590 B1 | | 2/2015 |
| KR | 20160035627 A | * | 4/2016 |

OTHER PUBLICATIONS

English translate (KR20160035627A), rederived date Mar. 31, 2025.*

English translate (CN105195585B), rederived date Mar. 31, 2025.*

* cited by examiner

METHOD OF MANUFACTURING PRESS-FORMED PRODUCT, AND TRAY AND HOT-PRESS MANUFACTURING LINE USED FOR MANUFACTURING PRESS-FORMED PRODUCT

TECHNICAL FIELD

The present invention relates to a method of manufacturing a press-formed product including the steps of heating, transportation and pressing, and a tray and a hot-press manufacturing line used for manufacturing a press-formed product.

BACKGROUND ART

Techniques are in use that heat material to a predetermined temperature and press the material using a press machine. For example, during hot pressing, material, i.e., steel sheet for hot pressing, is heated to the austenite range (i.e., about 900° C. and higher), and is hot press-formed. Thus, quenching is performed together with the forming process, thereby providing a press-formed product with a strength of the order of 1500 MPa or higher, for example. During typical hot stamping, quenching is performed as the sheet is rapidly cooled by contact heat transfer to the die during press-forming. This means that, to sufficiently produce the effects of quenching, the temperature of the material at the beginning of press-forming, which roughly corresponds to the quenching initiation temperature, must not be lower than a certain temperature. In such cases, this certain temperature at the beginning of press-forming is, for example, 700° C. or higher depending on the material.

Japanese Patent Nos. 5910305 and 5910306 each disclose a hot press-forming method involving positioning a plurality of electrically conductive sheet-shaped workpieces so as to overlap each other, attaching electrodes to the workpieces, and passing electricity through the workpieces to heat the sheet-shaped workpieces. The heated sheet-shaped workpieces are positioned at predetermined press locations that are different from the location where they receive electricity. Each of the sheet-shaped workpieces at the press locations is press-formed. Heating a plurality of sheet-shaped workpieces by simultaneously passing electricity therethrough improves productivity.

In the case of the above-described conventional techniques, heat is diffused out of the workpiece during transportation thereof, causing the temperature of the workpiece to decrease. As a result, when the workpiece is being transported into the die of the press machine, the workpiece may not be maintained at a temperature required from the workpiece, potentially leading to insufficient quenching of the press-formed product.

To solve this problem, Japanese Patent No. 5814669 discloses a transportation device for hot pressing, including a manufacturing line for hot pressing where a panel-shaped object is kept in a heated state and transported from one step to another of the line. The transportation device for hot pressing transports the heated object while the object is covered with a temperature-retaining cover. This maintains the object being transported at a temperature required for quenching.

Japanese Patent No. 4673656 discloses a hot press-forming apparatus including a device for heating a metal sheet that is being processed, including a primary heating means using dielectric heating and electrical heating, and a secondary heating means using radiant heat transmission. The secondary heating means using radiant heat transmission is provided on a device for transportation from the primary heating means to the hot press-forming die. Secondary heating using radiant heat transmission achieves uniform heating of the metal sheet, reducing temperature deviation in the metal sheet.

PRIOR ART DOCUMENTS

Patent Documents

Patent Document 1: Japanese Patent No. 5910305
Patent Document 2: Japanese Patent No. 5910306
Patent Document 3: Japanese Patent No. 5814669
Patent Document 4: Japanese Patent No. 4673656

SUMMARY OF THE INVENTION

Problems to be Solved by the Invention

The inventors noted that, if the material to be hot pressed has a reduced thickness, a temperature drop after heating of the material and during transportation to the press machine may affect the quality of the resulting press-formed product. The inventors investigated how to reduce temperature drop in the material being transported. In the course of the investigation, they found that merely covering the material being transported with a temperature-retaining cover, as with the above-described conventional techniques, may not be enough to sufficiently reduce temperature drop. A secondary heating means may be provided to heat the material during transportation. However, this requires additional equipment including a heat source for the secondary heating means provided on the transportation path. This increases the size of the entire equipment and may, at the same time, lead to increased equipment and/or operation costs.

In view of this, the present application discloses a method of manufacturing a press-formed product, as well as a tray, where, in hot press-forming, temperature drop in material during the transportation period after heating of the material until beginning of press-forming is reduced in a simple manner.

Means for Solving the Problems

A method of manufacturing a press-formed product according to an embodiment of the present invention includes: a heating step in which a sheet-shaped first workpiece and a sheet-shaped second workpiece are simultaneously heated; a transportation step in which the first and second workpieces heated at the heating step are transported to a press machine; and a pressing step in which the first and second workpieces transported to the press machine are processed by the press machine. At the heating step, the first and second workpieces are heated by a heating device while the first workpiece is placed on a first group of at least three struts extending upward from a tray body having an empty space extending therethrough in a top-bottom direction when viewed from above and the second workpiece is placed on a second group of at least three struts extending upward from the tray body and positioned above the first workpiece to overlap the first workpiece in a direction normal to a sheet surface of the first workpiece.

The transportation step includes a first transportation sub-step and a second transportation sub-step. At the first transportation sub-step, the first and second workpieces, together with the tray body, are transported from the heating device to a lifting location while the first workpiece is placed on the first group of struts and the second workpiece is placed on the second group of struts and positioned above the first workpiece to overlap the first workpiece in the direction normal to the sheet surface of the first workpiece. At the second transportation sub-step, the second workpiece placed on the second group of struts, when at the lifting location, is lifted upward by a transportation device and transported to a press location for the second workpiece, and the first workpiece placed on the first group of struts, when at the lifting location, is lifted upward by the transportation device and transported to a press location for the first workpiece.

Effects of the Invention

According to the present disclosure, in hot press-forming, temperature drop in material during the transportation period after heating of the material until beginning of press-forming is reduced in a simple manner.

EMBODIMENTS FOR CARRYING OUT THE INVENTION

Figure 1:
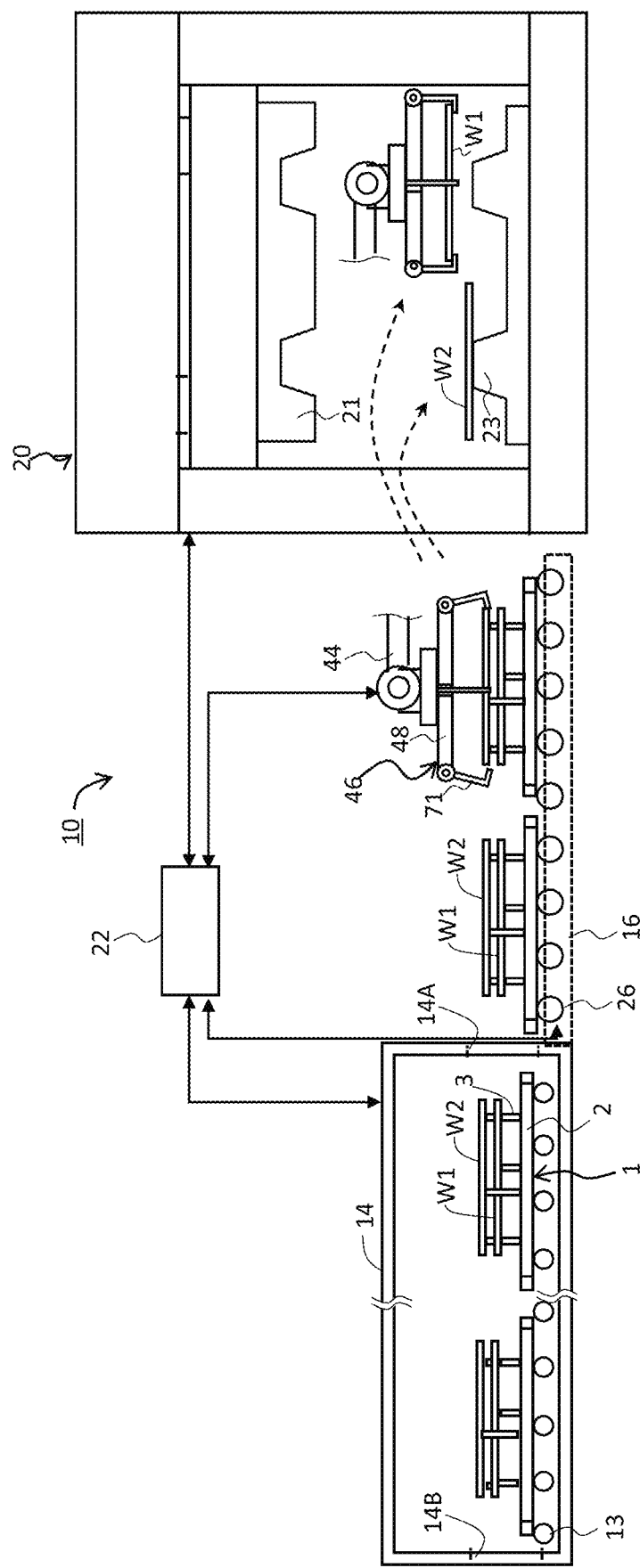
FIG. 1 is a schematic view of a hot-press manufacturing line according to an embodiment.

In hot press-forming, the temperature at the beginning of press-forming depends on the temperature to which material is heated and on the amount of temperature decrease after heating of the material in the period of time for which the material is transported to the die for press-forming. The temperature to which material is heated depends on metallurgical conditions. The period of time of transportation to the die after heating depends on the construction and/or specifications of the equipment. The amount of temperature decrease during this transportation depends on the heat capacity of the material. For example, in the case of a steel sheet, heat escapes mainly through heat transfer and heat radiation (or simply radiation) from the upper and lower surfaces to the atmosphere. The inventors noticed that the amount of temperature decrease during transportation significantly depends on the sheet thickness of the material. More specifically, as discussed above, as the sheet thickness of material decreases, the amount of temperature decrease increases even for the same transportation time, potentially making it difficult to provide a forming initiation temperature required for quenching. As a result, there may be cases where a part does not provide a strength required for press-forming.

The inventors did research to find a way to reduce temperature drop during transportation without an additional heat source. When a sheet-shaped material (i.e., workpiece) has been heated by a heating device, the workpiece is transported on a transportation path, such as a set of rollers, from the transportation device to a location at which the workpiece is lifted by a transportation device. The workpiece is lifted by the transportation device and placed on a press location in the press machine. The inventors closely looked at the state in which the workpiece is until being moved out of the heating device and lifted by the transportation device.

After extended research, the inventors arrived at positioning a plurality (e.g., two) sheet-shaped workpieces above a tray so that they overlap in the top-bottom direction, heating them in a heating device and, after heating, transporting them together with the tray from the heating device while they remain overlapping in the top-bottom direction. This allows a plurality of workpieces that face each other to receive radiant heat from each other during transportation after heating to provide supplemental amounts of heat to each other. Further, in addition to radiant heat, heat transfer also moves some amounts of heat from the workpiece to the ambient air. For example, if a plurality of workpieces are positioned to overlap in the direction perpendicular to the sheet surfaces of the workpieces while being in contact with each other, the contact portions are not in contact with air, which reduces amounts of heat moved through heat transfer from the workpieces to the air. Further, if a plurality of workpieces are positioned to overlap in the direction perpendicular to the sheet surfaces of the workpieces with some distance created between them, air warmed by heat transfer from the workpieces stays in the space between the heated workpieces. The presence of warmed air staying between the workpieces reduces the temperature differences between the air between the workpieces, on the one hand, and the workpieces themselves, on the other. This reduces movement of amounts of heat through heat transfer from the workpieces to the air, thus producing the temperature-retaining effect. This reduces temperature drop in the workpieces during transportation. The embodiments described below are based on these findings.

A method of manufacturing a press-formed product according to an embodiment of the present invention includes: a heating step in which a sheet-shaped first workpiece and a sheet-shaped second workpiece are simultaneously heated; a transportation step in which the first and second workpieces heated at the heating step are transported to a press machine; and a pressing step in which the first and second workpieces transported to the press machine are processed by the press machine. At the heating step, the first and second workpieces are heated by a heating device while the first workpiece is placed on a first group of at least three struts extending upward from a tray body having an empty space extending therethrough in a top-bottom direction when viewed from above and the second workpiece is placed on a second group of at least three struts extending upward from the tray body and positioned above the first workpiece to overlap the first workpiece in a direction normal to a sheet surface of the first workpiece.

The transportation step includes a first transportation sub-step and a second transportation sub-step. At the first transportation sub-step, the first and second workpieces, together with the tray body, are transported from the heating device to a lifting location while the first workpiece is placed on the first group of struts and the second workpiece is placed on the second group of struts and positioned above the first workpiece to overlap the first workpiece in the direction normal to the sheet surface of the first workpiece. At the second transportation sub-step, the second workpiece placed on the second group of struts, when at the lifting location, is lifted upward by a transportation device and transported to a press location for the second workpiece, and the first workpiece placed on the first group of struts, when at the lifting location, is lifted upward by the transportation device and transported to a press location for the first workpiece.

In the above-described manufacturing method, the first and second workpieces are heated in the heating device while positioned by the groups of struts of the tray to overlap in the top-bottom direction. After heating, the first and second workpieces, together with the tray, are transported from the heating device to the lifting location. Thus, the first and second workpieces overlap in the top-bottom direction from when within the heating device until being lifted by the transportation device. That is, the first and second workpieces overlap in the direction perpendicular (i.e., normal) to the sheet surface of the first workpiece. For example, the upper surface of the first workpiece faces the lower surface of the second workpiece. This allows the plurality of workpieces to receive radiant heat from each other to provide supplemental amounts of heat to each other from completion of heating until lifting by the transportation device. Further, for example, if a plurality of workpieces are positioned to overlap with a distance, air warmed by heat transfer from the workpieces stays in the space between the workpieces. This produces the temperature-retaining effect. Furthermore, the first workpiece is placed on the first group of struts, and the second workpiece is positioned above it, placed on the second group of struts. The groups of struts extend upward from the tray body. Thus, the groups of struts do not present an obstacle when the second, and then first, workpieces placed on the groups of struts are lifted upward by the transportation device. This enables performing the lifting operation in a simple and quick manner. As a result, in hot press-forming, temperature drop in the material during the transportation time after heating of the material until beginning of press-forming can be reduced in a simple manner.

The tray body may be constructed such that the area of the empty space is larger than the total area occupied by the constituent elements of the tray body when viewed from above. This facilitates transmission of heat from below the tray body to the first and second workpieces during the heating step. Each of the struts of the first and second groups may be located between adjacent empty spaces of the tray body when viewed from above. This further facilitates transmission of heat from below the tray body through the empty spaces around the struts of the first and second groups to the first workpiece on the first group of struts and the second workpiece on the second group of struts.

The sheet-shaped first and second workpieces are not limited to flat sheets. At least one of the sheet-shaped first and second workpieces may be, for example, a sheet with a projection protruding in the direction normal to the sheet surface, a sheet with an empty space extending through the sheet, or a curved sheet, for example. At least one of the first and second workpieces may be an intermediate formed product produced by forming or processing a flat sheet (i.e., blank), for example.

It is preferable that, at the first transportation sub-step, the first workpiece with its lower surface supported by the first group of struts and the second workpiece with its lower surface supported by the second group of struts are transported while overlapping each other in the direction normal to the sheet surface of the first workpiece, separated by a distance. This allows the upper and lower surfaces of each of the first and second workpieces to be in contact with air during transportation. This reduces the differences between the conditions of the upper surface and those of the lower surface of each of the first and second workpieces during transportation compared with implementations where the workpieces are in contact with each other. This reduces the difference between the quality of the upper surface and that of the lower surface of each of the first and second workpieces.

It is preferable that, at the heating step and the first transportation sub-step, the first workpiece placed on the first group of struts and the second workpiece placed on the second group of struts are positioned to overlap in the top-bottom direction so as to be separated by a distance not larger than 100 mm. This effectively reduces temperature drop by means of an appropriate distance between the first and second workpieces on the tray during transportation. If the distance between the heated workpieces is too large, an increased proportion of heat radiation, at the ends of the first and second heated workpieces, emitted from one workpiece in directions oblique to the normal to the sheet surface fails to reach the other (opposite) workpiece. As a result, the effect of reducing temperature drop may not be sufficiently produced. Further, if the distance between the workpieces is too large, air warmed by heat transfer from the two heated workpieces does not easily stay between the two workpieces, which means that the temperature-retaining effect may not be sufficiently produced.

It is preferable that, at the heating step and the first transportation sub-step, a relationship between a maximum distance D (mm) between the first workpiece placed on the first group of struts and the second workpiece placed on the second group of struts as measured in the top-bottom direction, on one hand, and a minimum sheet thickness t (mm) of a thinnest portion of the first and second workpieces, on the other, is represented by the expression below. This effectively reduces temperature drop in the first and second workpieces during transportation.

$$D \leq 120t$$

An area of a sheet surface of the second workpiece may be larger than an area of the sheet surface of the first workpiece. In such implementations, it is preferable that, at the heating step and the first transportation sub-step, the entire first workpiece placed on the first group of struts and the second workpiece placed on the second group of struts overlap in the top-bottom direction. This allows the entire first workpiece to receive radiant heat from the second workpiece. This facilitates uniformly maintaining the temperature of the entire first workpiece. Further, the struts of the second groups may be positioned on portions of the second workpiece that do not overlap the first workpiece. The area of the sheet surface of the first workpiece is defined as the area of the first workpiece in top view as placed on the first group of struts. The area of the sheet surface of the second workpiece is defined as the area of the second workpiece in top view as placed on the second group of struts.

A sheet thickness of the second workpiece may be larger than a sheet thickness of the first workpiece. That is, the first and second workpieces may have different sheet thicknesses. Further, in such implementations, temperature drop in the first workpiece with a smaller sheet thickness is reduced by radiant heat from the second workpiece with a relatively large heat capacity. This effectively reduces temperature drop in the first workpiece, which is thin and can easily experience temperature drop. This effect is particularly significant if the entire first workpiece and the second workpiece overlap in the top-bottom direction during transportation, as discussed above.

It is preferable that, at the heating step and the first transportation sub-step, a minimum value of a distance ΔW between an edge of the second workpiece placed on the second group of struts as viewed from above and an edge of the first workpiece placed on the first group of struts as viewed from above is not smaller than 5 mm. This ensures that there are places where the second group of struts can be positioned while avoiding the first workpiece.

It is preferable that, at the heating step and the first transportation sub-step, a maximum value of a distance ΔW between an edge of the second workpiece placed on the second group of struts as viewed from above and an edge of the first workpiece placed on the first group of struts as viewed from above is not larger than 30 mm. Thus, the area of the second workpiece that does not receive radiant heat from the first workpiece is not excessively large, which guarantees the effect of reducing temperature drop in the second workpiece.

At the first transportation sub-step, the first workpiece placed on the first group of struts and the second workpiece placed on the second group of struts may be transported while being covered with a shield from a front as determined along a direction of transportation. The shield prevents outside air from hitting the front sides, along the direction of transportation, of the workpieces, thereby reducing temperature decrease beginning at the front sides, along the direction of transportation, of the workpieces and, at the same time, prevents air staying between the two workpieces, warmed by heat transfer from the workpieces, from moving to the outside. This retains the temperature-retaining effect. This further reduces temperature drop in the workpieces during transportation.

The shield may include an inclined surface inclined so as to be located closer to the first and second workpieces going from a center toward an end. This allows air that has hit the shield to flow away from the first and second workpieces along the inclined surface. This increases the effect of reducing temperature drop in the workpieces during transportation.

At least one of the first workpiece placed on the first group of struts and the second workpiece placed on the second group of struts may have a long-length direction and a short-length direction. At the first transportation sub-step, the shield can cover the first workpiece placed on the first group of struts and the second workpiece placed on the second group of struts along the long-length direction. Covering the workpieces with a shield along the long-length direction further increases the effect of reducing temperature drop in the workpieces during transportation.

Each of the first and second workpieces may be a differential-thickness sheet with a large-thickness portion and a small-thickness portion. In such implementations, at the heating step and the first transportation sub-step, the large-thickness portion of the first workpiece placed on the first group of struts overlaps, as viewed in the top-bottom direction, the small-thickness portion of the second workpiece placed on the second group of struts. This allows the large- and small-thickness portions to provide supplemental amounts of heat to one another, thereby efficiently reducing temperature drop as a whole.

At the second transportation sub-step, the transportation device may simultaneously lift the second workpiece placed on the second group of struts and the first workpiece placed on the first group of struts, and transport the first and second workpieces from the lifting location to the press locations while the workpieces overlap in the direction normal to the sheet surface of the first workpiece. Simultaneous lifting of the first and second workpieces reduces the lifting time. Further, the first and second workpieces are transported from the lifting location to the press locations while overlapping each other. This further improves the effect of reducing temperature drop during transportation.

By way of example, the second transportation sub-step may include:
  driving a pair of first arms rotatably mounted on a base frame included in the transportation device to support a lower surface, at both ends, of the first workpiece placed on the first group of struts using claws of the pair of first arms and lift the workpiece;
  driving, using a system separate from that for the pair of first arms, a pair of second arms rotatably mounted on the base frame of the transportation device to support a lower surface, at both ends, of the second workpiece placed on the second group of struts using claws of the pair of second arms and lift the workpiece;
  transporting the first workpiece with the lower surface supported, at both ends, by the claws of the pair of first arms of the transportation device and the second workpiece with the lower surface supported, at both ends, by the claws of the pair of second arms, while the workpieces overlap each other in the direction normal to the sheet surface of the first workpiece;
  driving the pair of first arms to lower the first workpiece supported by the pair of first arms to a press location in the press machine; and
  driving, using the system separate from that for the pair of first arms, the pair of second arms to lower the second workpiece supported by the pair of second arms to a press location in the press machine.

Thus, the second and first workpieces may be lifted simultaneously, and the first and second workpieces may be transported from the lifting location to the press locations while overlapping in the direction normal to the sheet surface of the first workpiece. It will be understood that the transportation device is not limited to an arrangement that simultaneously lifts the second and first workpieces and transporting these workpieces while the workpieces overlap. For example, the transportation device may include a first transportation sub-device that lifts and transports the second workpiece and a second transportation sub-device that lifts and transports the first workpiece.

A tray according to an embodiment of the present invention includes: a tray body shaped to expand in a plane perpendicular to a top-bottom direction and including an empty space extending therethrough in the top-bottom direction; and a first group of struts and a second group of struts extending upward from the tray body. The first group of struts include at least three struts constructed to be capable of supporting a lower surface of a sheet-shaped first workpiece; and the second group of struts include at least three struts constructed to be capable of supporting a lower surface of a sheet-shaped second workpiece located above the first workpiece supported by the first group of struts. The first group of struts are disposed such that imaginary straight lines connecting the struts form at least one triangle when viewed from above. The second group of struts are disposed at locations different from those of the first group of struts when viewed from above and disposed such that imaginary straight lines connecting the struts form at least one triangle when viewed from above. A top of every one of the struts of the second group is located higher than a top of that one of the struts of the first group whose top is located lowest.

In the above-described arrangement, the first and second workpieces are supported, above the tray, by the first and second groups of struts while overlapping in the top-bottom direction. For example, the first and second workpieces are supported on the tray while the upper surface of the first workpiece and the lower surface of the second workpiece face each other. Thus, the first and second workpieces may be heated by the heating device while being placed on the tray so as to overlap in the top-bottom direction and, with this state kept, transported from the heating device to the lifting location. This allows the first and second workpieces to receive radiant heat from each other to provide supplemental amounts of heat to each other from completion of heating until lifting by the transportation device. Further, the group of struts extend upward from the tray body. Thus, the group of struts do not present an obstacle during lifting upward, by the transportation device, of the second and first workpieces placed on the group of struts. It enables performing the lifting operation in a simple and quick manner. As a result, in hot press-forming, temperature drop in the material can be reduced in a simple manner during the transportation time after heating of the material until beginning of press-forming. That is, a tray used in heating/transportation of material for hot press-forming is provided that reduces temperature drop in the material during the transportation time in a simple manner.

The group of struts may be fixed to the tray body. That is, the group of struts may be fixedly mounted on the tray body. This simplifies the construction of the tray. On the contrary, if the heights of the individual groups of struts are variable relative to the tray body, a heat-resistant driving mechanism is required. In such implementations, the construction is complicated and requires increased manufacturing costs.

The second group of struts may include at least three struts with tops located higher than tops of at least three respective struts of the first group by a predetermined height $\Delta H$. In such implementations, the second workpiece supported by the second group of struts can be positioned at a location higher than the first workpiece supported by the first group of struts by the predetermined height $\Delta H$.

It is preferable that the predetermined height $\Delta H$ is equal to a maximum sheet thickness of the first workpiece plus 0 to 100 mm. This keeps the distance between the first and second workpieces placed on the tray and transported at an appropriate amount, thereby effectively reducing temperature drop.

The tray may further include a shield adapted to cover, along a direction perpendicular to the top-bottom direction, a height range between a height of that one of the struts of the first and second groups whose top is located lowest and a height of that strut whose top is located highest. The shield further reduces temperature drop in the first and second workpieces placed on the tray and transported.

The shield may have an inclined surface inclined so as to be located closer to the first and second groups of struts going from a center toward an end. This allows outside air that has hit the shield during transportation of the first and second workpieces placed on the tray to flow away from the first and second workpieces along the inclined surface. This increases the effect of reducing temperature drop in the first and second workpieces during transportation.

The tray body may have a long-length direction and a short-length direction as viewed from above. The shield may cover the tray body along the long-length direction as viewed from above. Covering the tray body with a shield along the long-length direction further increases the effect of reducing temperature drop in the workpieces placed on the tray and transported.

A hot-press manufacturing line according to an embodiment of the present invention includes: the tray; a heating device adapted to heat the first workpiece and the second workpiece placed on the tray; a transportation path provided between the heating device and a lifting location for the first and second workpieces to transport the tray from the heating device to the lifting location; a transportation device adapted to support, and lift upward, the first and second workpieces placed on the tray when at the lifting location; at least one press machine including at least two pairs of die parts; and a moving device adapted to move the transportation device between the lifting location and press locations each located between the die parts of one of the at least two pairs of die parts.

The transportation device may include: a base frame movable in a lateral direction perpendicular to the top-bottom direction; a pair of first arms rotatably mounted on the base frame; a pair of second arms rotatably mounted on the base frame; a first drive unit adapted to drive the first arms; and a second drive unit adapted to drive the second arms.

The pair of first arms include: a pair of first bases arranged in the lateral direction of the base frame and extending from the base frame in the top-bottom direction; and a pair of first claws extending, with a bend, from the respective first bases in the lateral direction.

The pair of second arms include: a pair of second bases arranged in the lateral direction of the base frame and extending from the base frame in the top-bottom direction; and a pair of second claws extending, with a bend, from the respective second bases in the lateral direction.

The first drive unit rotates the pair of first arms relative to the base frame to change a lateral distance between the first claws.

The second drive unit rotates the pair of second arms relative to the base frame to change a lateral distance between the second claws.

The first and second drive units are configured, independently from each other, to be capable of controlling rotation of the first arms and rotation of the second arms, respectively.

The pair of first claws are capable, when close to each other in the lateral direction, of supporting a lower surface of the first workpiece at both ends as determined along the lateral direction.

The pair of second claws are capable, when close to each other in the lateral direction, of supporting a lower surface of the second workpiece at both ends as determined along the lateral direction.

A location of the pair of first claws in the top-bottom direction and a location of the pair of second claws in the top-bottom direction are different from each other.

Now, embodiments of the present invention will be described in detail with reference to the drawings. The same or corresponding components in the drawings are labeled with the same reference numerals, and their description will not be repeated. The size ratios of the components shown in the drawings do not necessarily represent their actual size ratios.

[Exemplary Construction of Apparatus]

FIG. 1 is a schematic view of a hot-press manufacturing line 10 according to an embodiment. The hot-press manufacturing line 10 includes a heating device 14, a transportation table 16, a manipulator 44, a transportation device 46, a press machine 20, and a controller 22. The transportation table 16 is located near an outlet 14A of the heating device 14. The transportation table 16 is located between the heating device 14 and press machine 20.

Inside the heating device 14, a plurality of workpieces W1 and W2 are placed on a single tray 1 so as to overlap in the top-bottom direction. After the plurality of workpieces W1 and W2 placed on the tray 1 are heated by the heating device 14, the workpieces, together with the tray 1, are moved to exit the heating device 14. The tray 1, with the workpieces W1 and W2 placed thereon, exits the heating device 14 and is transported on the transportation table 16 to a location for lifting by the transportation device 46.

(Heating Device)

The heating device 14 heats an object to be heated. The heating device 14 may be, for example, a resistance heating furnace, a gas heating furnace, a far-infrared heating furnace, or a near-infrared heating furnace. The heating device 14 is not limited to a heating furnace, and may be, for example, a high-frequency induction heating device, a low-frequency induction heating device, or an electrical heating device that causes electricity to directly flow through the object to be heated to heat the object. The heating device 14 may include a heating chamber. The heating device 14 may include, inside the heating chamber, a plurality of in-chamber rollers 13 that are driven by a driving mechanism, not shown, and rotate. Rotating the in-chamber rollers 13 transports the object being heated (i.e., workpieces W1 and W2) on the in-chamber rollers 13. The outlet 14A and an inlet 14B of the heating device 14 are located forward and rearward, respectively, as determined along the direction of transportation of the object being heated in the heating chamber.

(Transportation Table)

The transportation table 16 includes a plurality of transportation rollers 26 that are driven by a driving mechanism, not shown, and rotate. As the transportation rollers 26 rotate in synchronization with the in-chamber rollers 13, the object being transported is transported between the transportation table 16 and the interior of the heating chamber of the heating device 14. The transportation rollers 26 are spaced apart from one another. The transportation table 16 is an example of a transportation path along which the tray 1 with the heated workpieces W1 and W2 placed thereon is transported from the heating device 14 to the lifting location. A lifting location for the workpieces by the transportation device 46 is provided above the transportation table 16. It will be understood that the construction of the transportation path is not limited to the transportation table 16 shown in FIG. 1. For example, the transportation path may be a belt conveyor, rails, or the like. Further, although the lifting location is on the transportation path in the implementation shown in FIG. 1, the lifting location need not be on the transportation path. The lifting location may be on a stand, for example, provided separately from the transportation path and located at the destination of transportation.

(Press Machine)

The press machine 20 includes a lower die part 23 and an upper die part 21 for press-forming an object to be pressed. By way of example, the lower die part 23 is constituted by a punch; by way of example, the upper die part 21 is constituted by a die block. Channels for coolant may be provided in the upper and lower die parts 21 and 23. Thus, heat taken from the object being pressed during press-forming may be released by means of coolant. Two workpieces may be positioned between the upper and lower die parts 21 and 23. The upper and lower die parts 21 and 23 are movable relative to each other. With two workpieces positioned between the upper and lower die parts 21 and 23, the press machine 20 moves the upper and lower die parts 21 and 23 closer to each other to press-form the two workpieces. The operation of the upper and lower die parts 21 and 23 may be controlled by the controller 22, for example. In the present implementation, the lower and upper die parts 23 and 21 of the press machine 20 are shaped so as to simultaneously produce a plurality of press-formed products. In this implementation, two pairs of die parts are provided in one press machine. In the present implementation, a plurality of workpieces W1 and W2 are positioned between the lower and upper die parts 23 and 21 of the press machine 20 such that the plurality of workpieces W1 and W2 are press-formed simultaneously. A plurality of press machines 20 may be provided. For example, two press machines may be provided, each including one pair of die parts.

(Manipulator)

The manipulator 44 uses the transportation device 46 to transport the object being transported from the transportation table 16 to the press machine 20. The transportation device 46 operates by lifting a workpiece, i.e., object being transported, holding it, and placing it on a surface. The manipulator 44 controls the location and attitude of the transportation device 46. The transportation device 46 may be an end effecter of the manipulator 44. The manipulator 44 moves the transportation device 46 between the lifting location on the transportation table 16 and a press location between the die parts (i.e., upper and lower die parts 21 and 23) of each of the two pairs of die parts in the press machine 20. The manipulator 44 includes a base rotatable about at least one axis and an arm extending from the base and having at least one joint. The transportation device 46 is rotatably mounted on the distal end of the arm. A moving device for moving the transportation device 46 is not limited to a manipulator. For example, a moving device may include rails connecting the transportation table 16 and press machine 20 and a suspension device for suspending the transportation device 46 above the rails and moving it up and down.

(Controller)

The Controller 22 controls the heating device 14, transportation table 16, press machine 20, and manipulator 44

(and thus transportation device 46). The controller 22 is constituted by one or more computers each including a processor and memory, for example. The control of these components is implemented by the processor executing a program stored on the memory. The controller 22 transmits control signals or control data to the heating device 14, transportation table 16, press machine 20, and manipulator 44 (and thus transportation device 46). Further, the controller 22 may receive signals or data indicating the states of these components. By way of example, the controller 22 may include control units (constituted by, for example, circuits or processors) distributed among the heating device 14, transportation table 16, manipulator 44, and press machine 20 for controlling these devices. In such implementations, the controller 22 may include an overall-control computer that supplies the control units of the various devices with control information to control the operation of the entire hot-press manufacturing line 10. The operation of the arms 71 of the transportation device 46, described further below, may be controlled by part of the controller 22, such as the control unit of the manipulator 44.

(Transportation Device)

The transportation device 46 includes a base frame 48, as well as at least one pair of arms 71 rotatably mounted on the base frames 48. A joint 56 is provided on the upper surface of the base frame 48 to be connected to the manipulator 44. The joint 56 is connected to the manipulator such that the base frame 48 is rotatable, about an axis in the top-bottom direction, relative to the manipulator 44.

The pair of arms 71 are separated from each other in a lateral direction of the base frame 48 (i.e., direction perpendicular to the top-bottom direction). Each of the arms 71 includes a base extending from the base frame 48 in the top-bottom direction, and a claw extending, with a bend, from the base in the lateral direction. Controlling rotation of the arms 71 relative to the base frame 48 controls the arms to be in a closed state, where the claws of the arms 71 are located closer to each other, and an open state, where they are located far away from each other.

(Tray)

Figure 2:
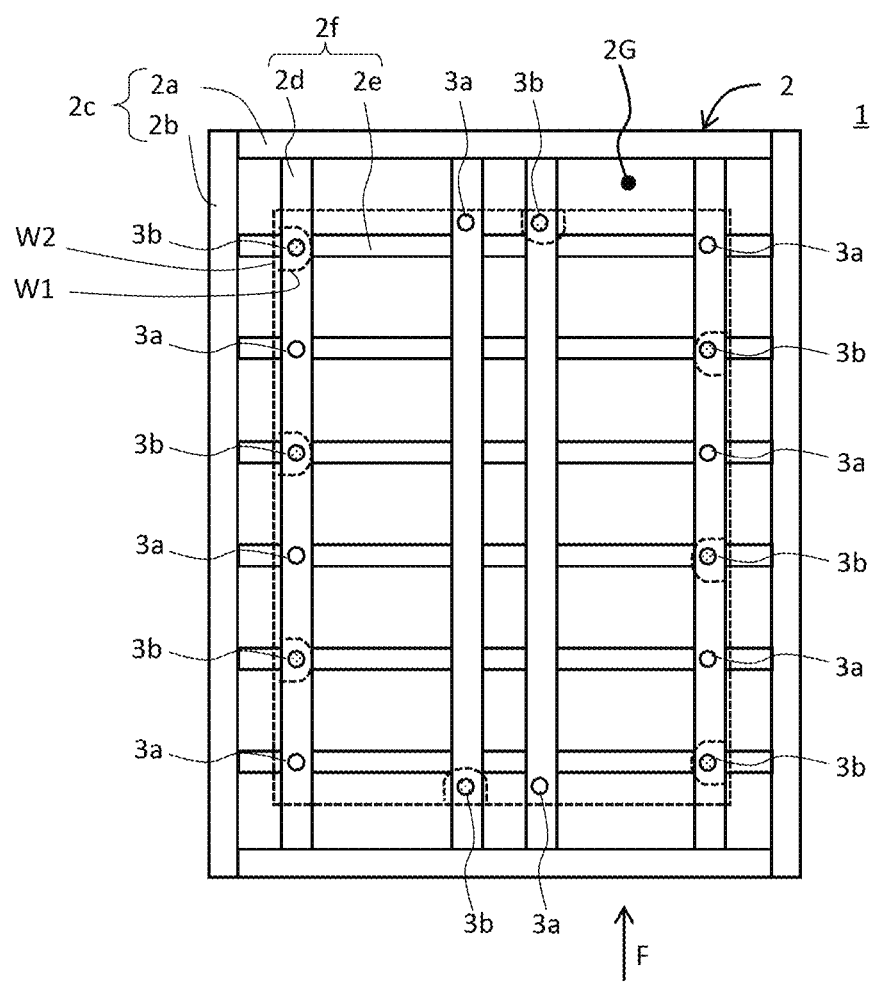
FIG. 2 is a top view of a tray according to an embodiment.
Figure 3:
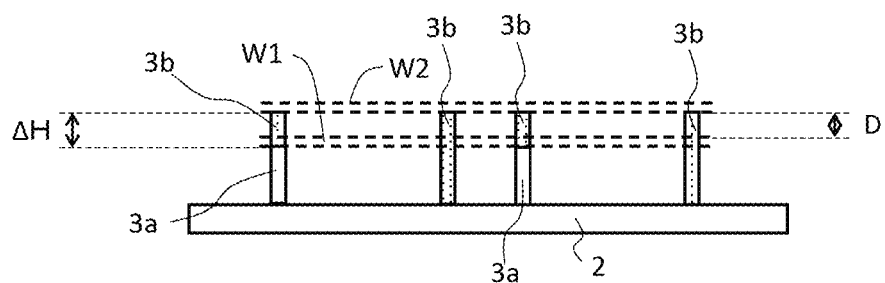
FIG. 3 is a side view of the tray shown in FIG. 2 as viewed in the direction of arrow F.

FIG. 2 is a top view of the tray 1. FIG. 3 is a side view of the tray 1 shown in FIG. 2 as viewed in the direction of arrow F. The tray 1 is a tray used in heating/transporting of the material (i.e., workpiece) for hot pressing. The tray 1 is constructed to resist heating temperatures for workpieces. In the implementation shown in FIG. 2, the tray body 2 includes empty spaces 2G shaped to expand in a plane perpendicular to the top-bottom direction and extending in the top-bottom direction through the tray body. When viewed from above, the total area of the empty spaces 2G is larger than the total area occupied by the constituent members of the tray body 2. The tray 1 includes a plurality of struts 3 extending upward from the tray body 2. The plurality of struts 3 include a first group of struts 3a that allow the first workpiece W1 to be placed thereon, and a second group of struts 3b that allow the second workpiece W2 to be placed thereon above the first workpiece W1. Every one of the struts of the first and second groups 3a and 3b is located between adjacent empty spaces 2G of the tray body 2 as viewed from above.

(Tray Body)

In the implementation shown in FIG. 2, the tray body 2 includes a frame 2c and rod members 2f located inside the frame 2c and bridging the frame. The frame 2c includes a pair of vertical frame members 2b and a pair of horizontal frame members 2a. The pair of vertical frame members 2b are located parallel to each other, and laterally separated. The pair of horizontal frame members 2a are located between the vertical frame members 2b and parallel to each other, and vertically separated. The pair of vertical frame members 2b and the pair of horizontal frame members 2a form a rectangular frame 2c when viewed from above. The rod members 2f include vertical rod members 2d and horizontal rod members 2e. The vertical rod members 2d bridge the pair of horizontal frame members 2a. The horizontal rod members 2e bridge the pair of vertical frame members 2b. The rod members 2f are disposed grid-wise inside the frame 2c.

The rod members 2f (i.e., at least one of the set of vertical rod members 2d and the set of horizontal rod members 2e) may be constructed to be adjustable in position relative to the frame 2c. For example, the frame 2c may be provided with a plurality of positioning holes or engagement lugs. In such implementations, the rod members 2f are fixed to the holes or engagement lugs on the frame 2c using fastening members, for example, as necessary. The positions of the rod members 2f relative to the frame 2c can be adjusted by changing the holes or engagement lugs, i.e. locations, to which the rod members 2f are fixed.

The construction of the tray body 2 is not limited to the implementation shown in FIG. 2. For example, the tray body may have the shape of a ladder including a pair of vertical rod members disposed generally parallel and separated from each other, and a plurality of horizontal rod members located between the vertical rod members and bridging the pair of vertical rod members in the direction perpendicular thereto. Alternatively, the tray body may be constituted by a sheet-shaped member including a plurality of holes extending through the tray body in the top-bottom direction, which serve as empty spaces.

The constituent members of the tray body 2 (in the implementation of FIG. 2, frame 2c and rod members 2f) may be pipes or solid members. Alternatively, the constituent members of the tray body 2 may be angle members with an L-shaped cross section, or channel members with a U-shaped cross section. The constituent members of the tray body 2 are not limited to any particular material, and may be formed from a heat-resistant material, such as heat-resistant steel or ceramics, for example. It is desirable that the maximum use temperature of the constituent members be, for example, not lower than 900° C., a temperature range commonly found in heating devices, and not higher than 1050° C., which is an upper-limit setting temperature for heating devices. Examples of heat-resistant steels (heat-resistant alloy steels) that can be used for the constituent members include SCH22 (0.4C-25Cr-20Ni), SCH24 (0.4C-25Cr-35Ni—Mo, Si). Constituent members of the tray body 2 formed from a heat-resistant alloy steel can be easily processed and produced.

(Struts)

The first group of struts 3a include at least three struts, where the imaginary straight lines connecting the struts form a triangle when viewed from above. The second group of struts 3b include at least three struts, where the imaginary straight lines connecting the struts form a triangle when viewed from above. Every one of the struts of the second group 3b is at a location different from that of any one of the struts of the first group 3a when viewed from above. The top of every one of the struts of the second group 3b is located higher than the top of that strut of the first group 3a whose top is located lowest. Thus, the first group of struts 3a are capable of supporting the first workpiece W1. The second group of struts 3b are capable of supporting the second workpiece W2 such that this workpiece is located above the first workpiece W1 supported by the first group of struts 3a.

The second group of struts 3b are positioned in the sub-regions occupied by the second workpiece W2 when viewed from above but that do not overlap the region occupied by the first workpiece W1. Further, the second group of struts 3b are constructed not to overlap the region occupied by the first workpiece W1 when viewed from above. That is, the second group of struts 3b are constructed such that the first workpiece W1, when lifted up by the transportation device 46, does not get snagged on the second group of struts 3b.

The struts of the first group 3a and those of the second group 3b are not limited to any particular numbers. The number of the struts of the first group 3a and the number of the struts of the second group 3b may be the same or different. For example, the number of the struts of the second group 3b may be larger than the number of the struts of the first group 3a if the support for the second workpiece W2 is to be stronger than that for the first workpiece W1 to take account of the characteristics and/or support locations of the first and second workpieces W1 and W2, for example.

The struts of the first and second groups 3a and 3b (hereinafter simply referred to as struts 3 when no distinction is made) may each have the shape of a column, such as a circular column or a rectangular column, or a cone, such as a circular cone or a pyramid, for example. Each strut 3 may be a solid member or a pipe. The struts 3 are not limited to any particular material, and may be formed from a heat-resistant material, such as heat-resistant steel or ceramics, for example. It is desirable that the maximum use temperature of the struts 3 be, for example, not lower than 900° C., a temperature range commonly found in heating devices, and not higher than 1050° C., which is an upper-limit setting temperature for heating devices. Examples of heat-resistant steels (heat-resistant alloy steels) that can be used for the constituent members of the struts 3 include SCH22 (0.4C-25Cr-20Ni) and SCH24 (0.4C-25Cr-35Ni—Mo, Si). The struts 3 are fixed to the tray body 2. For example, the struts 3 may be inserted into holes in the tray body 2 and thus attached to the tray body 2. In such implementations, for example, the struts 3 may be fixed to the tray body 2 by a male thread provided on the outer periphery of an end of a strut 3 engaging a female thread on the inner periphery of a hole in the tray body 2. Alternatively, the struts 3 may be press-fit into holes in the tray body 2. The means for fixing the struts 3 are not limited to holes in the tray body 2. The struts 3 may be fixed to the tray body 2 by other fixing means.

(Exemplary Arrangement of First and Second Workpieces)

In the implementation shown in FIG. 2, the first workpiece W1 includes notches on edges (i.e., ends) when viewed from above. The struts of the second group 3b are located in regions corresponding to the notches of the first workpiece W1. Thus, as the struts of the second group 3b are located in the regions corresponding to the notches or holes of the first workpiece W1, the struts of the second group 3b can be positioned in regions that do not overlap the first workpiece W1 when viewed from above. For example, at least one of the struts of the second group 3b may be positioned in a region corresponding to a locating hole of the first workpiece W1. A locating hole is used to position the first workpiece W1 during press-forming.

Figure 4:
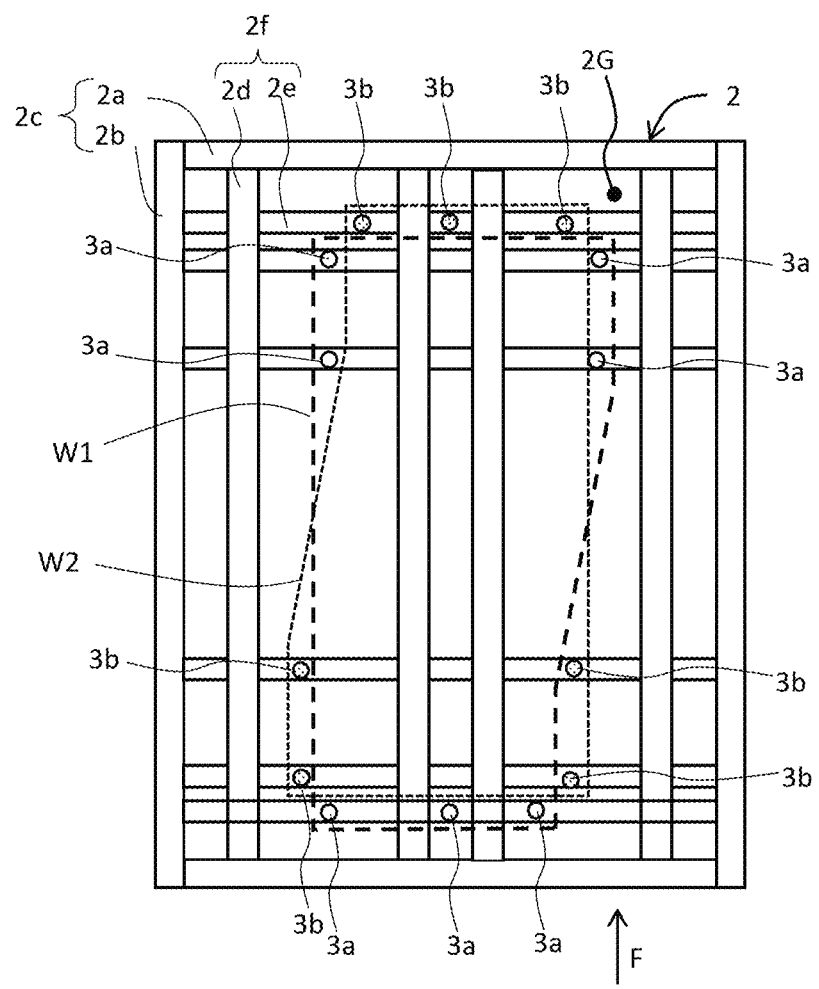
FIG. 4 is a top view of a tray with another exemplary arrangement of the first and second groups of struts.
Figure 5:
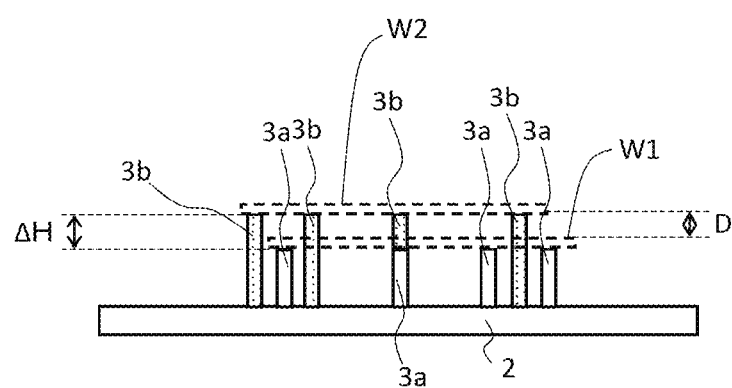
FIG. 5 is a side view of the tray shown in FIG. 4 as viewed in the direction of arrow F.

FIG. 4 is a top view of a tray with another exemplary arrangement of the first and second groups 3a and 3b of struts. FIG. 5 is a side view of the tray 1 shown in FIG. 4 as viewed in the direction of arrow F. In the implementation shown in FIGS. 4 and 5, the first and second workpieces W1 and W2, which have the same shape, are positioned to be displaced from each other as viewed from above. That is, when viewed from above, the first and second workpieces W1 and W2 are positioned such that some portions of the second workpiece W2 do not overlap the first workpiece W1. The struts of the second group 3b are disposed at locations in a region occupied by the second workpiece W2 and that do not overlap the region occupied by the first workpiece W1. In such implementations, no notches or holes need be provided in the first workpiece W1. In the implementation shown in FIG. 4, the shape of the first workpiece W1 as viewed from above results from a 180-degree rotation of the second workpiece W2 about an axis in the direction normal to the sheet surfaces.

In the implementations shown in FIGS. 2 to 5, the difference between the height (i.e., length as measured in the top-bottom direction) of the second group of struts 3b and that of the first group of struts 3a is denoted by $\Delta H$. Thus, at least three pairs of struts may be provided, each pair having a strut of the first group 3a and another strut of the second group 3b whose top is higher than the top of the former by $\Delta H$. This allows the first and second workpieces W1 and W2 to be positioned so as to overlap in the top-bottom direction, with a distance of $\Delta H$ created between the lower surface of the first workpiece and the lower surface of the second workpiece. For example, if both the first and second workpieces W1 and W2 are flat sheets as in the implementations of FIGS. 2 to 5, all the struts of the first group 3a have the same height, and all the struts of the second group 3b have the same height. Thus, the top of every one of the struts of the second group 3b is located higher than the top of the corresponding one of the struts of the first group 3a by $\Delta H$. If $\Delta H$ is equal to the sheet thickness of the first workpiece W1, the upper surface of the first workpiece W1 and the lower surface of the second workpiece W2 are in contact.

Figure 6:
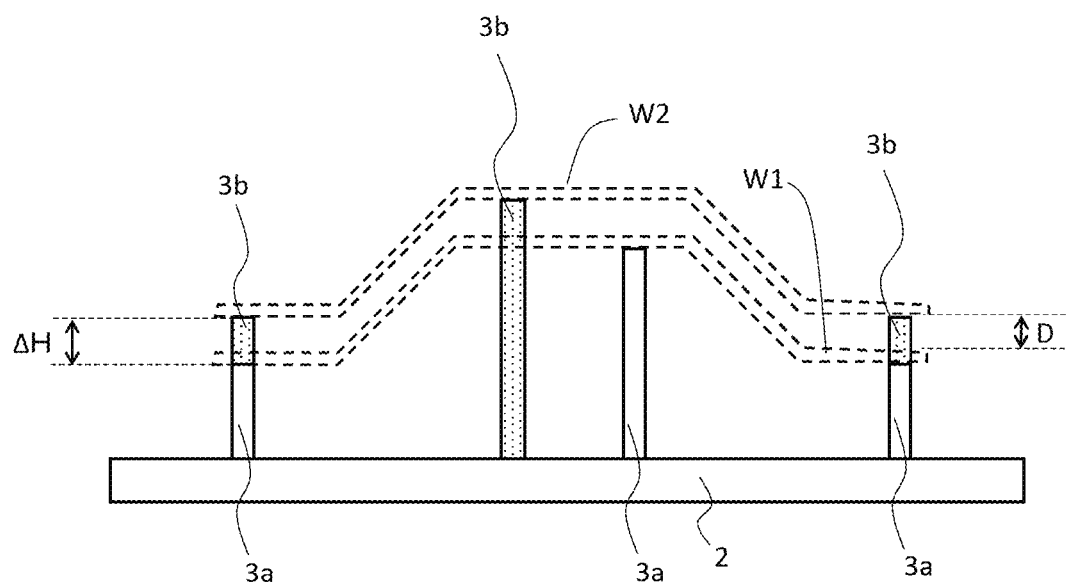
FIG. 6 is a side view of a tray with groups of struts accommodating first and second workpieces that are not flat sheets.
Figure 7:
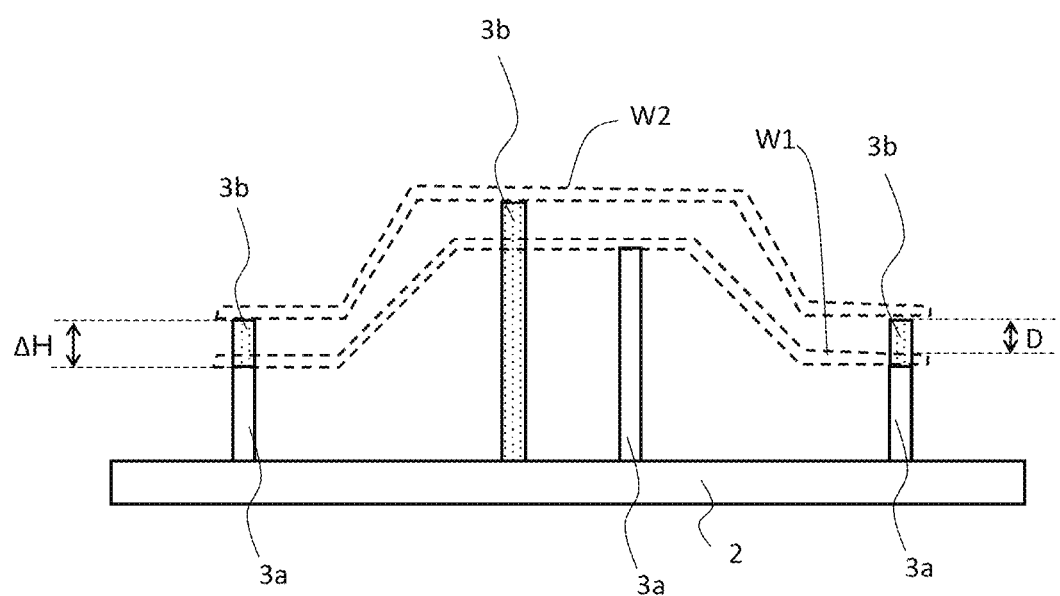
FIG. 7 is a side view of a tray with groups of struts accommodating first and second workpieces that are not flat sheets.

The first and second workpieces W1 and W2 need not be flat sheets. Each of FIGS. 6 and 7 is a side view of a tray with groups of struts accommodating first and second workpieces that are not flat sheets. FIG. 6 shows an implementation for first and second workpieces W1 and W2 that are intermediate formed products with the same shape. In this implementation, each of the first and second workpieces W1 and W2 has been processed to have the same hat-shaped cross section. In this implementation, too, at least three pairs of struts are provided, each pair having a strut of the first group 3a and another strut of the second group 3b whose top is higher than the top of the former by $\Delta H$. $\Delta H$ is the distance between the lower surface of the first workpiece W1 and the lower surface of the second workpiece W2 as measured in the top-bottom direction.

As shown in FIG. 7, the first and second workpieces W1 and W2 may have different cross-sectional shapes. In this implementation, too, at least three pairs of struts are provided, each pair having a strut of the first group 3a and another strut of the second group 3b whose top is higher than the top of the former by $\Delta H$.

The distance between the first and second workpieces W1 and W2 placed on the tray 1 is determined by the distance $\Delta H$ between the heights of the struts of the first group 3a and the heights of the corresponding struts of the second group 3b. That is, the distance D in the top-bottom direction between the first and second workpieces W1 and W2 on the tray 1 during heating and transportation is determined by $\Delta H$. The maximum value of the distance D between the first and second workpieces W1 and W2 on the tray during heating and transportation is preferably not larger than 100 mm, for example. The smaller the distance D, the better to allow the first and second workpieces W1 and W2 on the tray 1 to receive radiant heat from each other to reduce temperature drop. The maximum value of the distance D is more preferably not larger than 50 mm, yet more preferably not larger than 30 mm, still more preferably not larger than 10 mm. No particular lower limit for the distance D is specified; the distance required for the operation of placing the workpieces on the tray 1 and lifting them therefrom represents the lower limit for the distance D. A preferred range for ΔH is a preferred range for the distance D plus the maximum sheet thickness of the first workpiece W1. For example, if the first workpiece W1 has a sheet thickness of about 3 mm, a preferred range for ΔH may be 3 to 103 mm.

Figure 8:
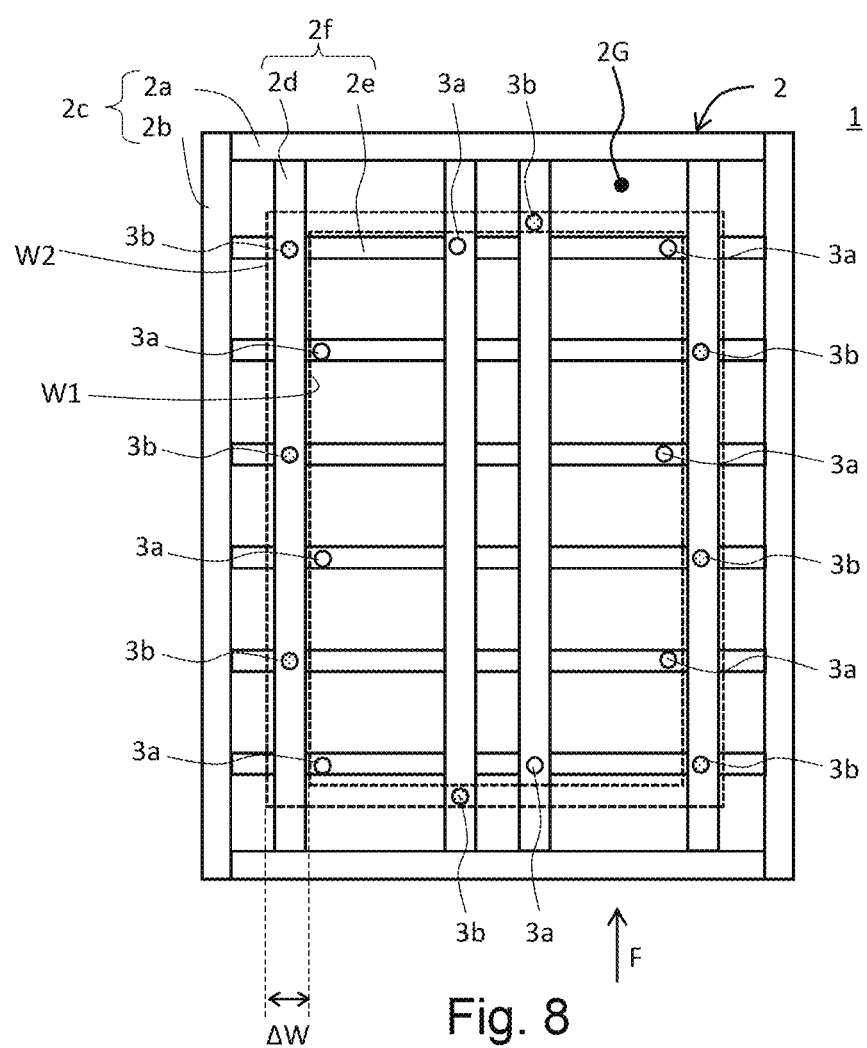
FIG. 8 is a top view of a tray accommodating first and second workpieces W1 and W2 with different surface areas as viewed from above.
Figure 9:
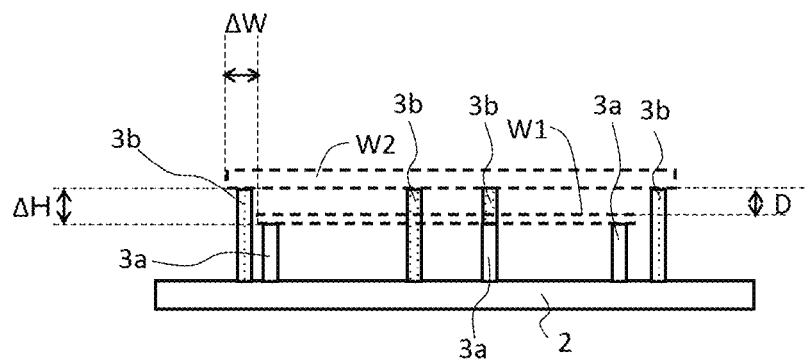
FIG. 9 is a side view of the tray shown in FIG. 8 as viewed in the direction of arrow F.

FIG. 8 is a top view of a tray 1 accommodating first and second workpieces W1 and W2 with different surface areas as viewed from above. FIG. 9 is a side view of the tray shown in FIG. 8 as viewed in the direction of arrow F. In the implementation shown in FIGS. 8 and 9, the area of a sheet surface of the second workpiece W2 is larger than the area of a sheet surface of the first workpiece W1. Thus, the first and second workpieces W1 and W2 may have different sizes. The second workpiece W2 overlaps the entire first workpiece W1 in the top-bottom direction. Thus, as viewed from above, an end (i.e., edge) of the second workpiece W2 is located outward of the corresponding end (i.e., edge) of the first workpiece W1. The second group of struts 3b are located in the regions between the edges of the second workpiece W2 and the edges of the first workpiece W1 as viewed from above. That is, the second group of struts 3b are located in the regions where the second workpiece W2 does not overlap the first workpiece W1 as viewed from above. Thus, the first and second workpieces W1 and W2 may be supported by the first and second groups of struts 3a and 3b so as to overlap each other in the top-bottom direction even without notches or holes, for example, in the first workpiece W1. In such implementations, the second group of struts 3b are located in the regions outside the regions where the first group of struts 3a are located as viewed from above.

The distance ΔW between an edge of the second workpiece W2 placed on the second group of struts 3b as viewed from above and the corresponding edge of the first workpiece W1 placed on the first group of struts 3a as viewed from above is not limited to any particular value, but is preferably not larger than 30 mm. If ΔW is too large, it means a large area of edge portions of the second workpiece W2 that do not overlap the first workpiece W1. This decreases the effect of reducing temperature drop in the edge portions of the second workpiece W2. In view of this, ΔW is more preferably not larger than 20 mm, and yet more preferably not larger than 15 mm. If ΔW is too small, it is difficult to ensure that there is an area where the second group of struts 3b can be disposed. In view of this, the minimum value of ΔW is preferably not smaller than 5 mm, more preferably not smaller than 8 mm, and yet more preferably not smaller than 10 mm.

Here, ΔW is the distance between an edge of the second workpiece W2 and the corresponding edge of the first workpiece W1 as measured in the direction perpendicular to the line of the edge of the second workpiece W2 (if the line of the edge is a curved line, the direction normal thereto) as viewed from above.

In FIGS. 8 and 9, both the first and second workpieces W1 and W2 are flat sheets; alternatively, at least one of the first and second workpieces W1 and W2 may be an intermediate formed product in lieu of a flat sheet. In such implementations, too, the area of the second workpiece W2 placed on the second group of struts 3b may be larger than the area of the first workpiece W1 placed on the first group of struts 3a as viewed from above.

In the implementation shown in FIG. 9, the sheet thickness of the second workpiece W2 is larger than the sheet thickness of the first workpiece W1. The smaller the sheet thickness, the higher the rate of temperature drop. Thus, positioning the entire first workpiece W1, which has a smaller sheet thickness, so as to overlap the second workpiece W2, which has a larger sheet thickness, increases the effect of reducing temperature drop in the first workpiece W1. As a result, the effect of reducing temperature drop in the first and second workpieces W1 and W2 as a whole is increased. Alternatively, the first and second workpieces W1 and W2 may have the same sheet thickness.

(Exemplary Arrangements of Differential-Thickness Sheets)

Figure 10:
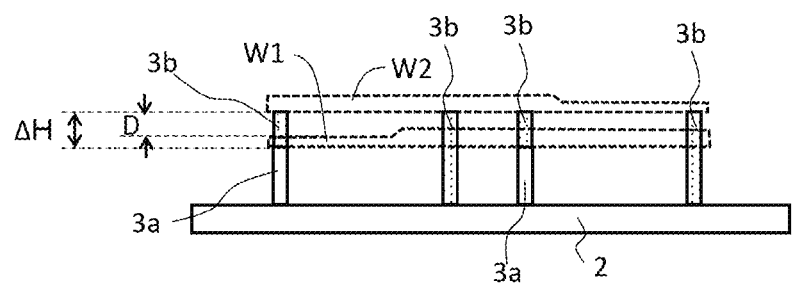
FIG. 10 is a side view of a tray accommodating first and second workpieces that are differential-thickness sheets.

At least one of the first and second workpieces W1 and W2 may be a differential-thickness sheet including a large-thickness portion and a small-thickness portion. FIG. 10 is a side view of a tray accommodating first and second workpieces W1 and W2 that are differential-thickness sheets. In the implementation shown in FIG. 10, the large-thickness portion of the first workpiece W1 placed on the first group of struts 3a and the small-thickness portion of the second workpiece W2 placed on the second group of struts 3b overlap each other in the top-bottom direction. This allows the two workpieces to be transported while the small-thickness portion of one workpiece, which has a smaller sheet thickness within this workpiece and thus can experience temperature drop more easily, is faced by the large-thickness portion of the other workpiece, which has a relatively high heat capacity within this workpiece. This reduces temperature drop in the small-thickness portions of both workpieces more effectively. This efficiently reduces temperature drop in the entirety of both workpieces and, at the same time, efficiently reduces the temperature difference between the small-thickness portion and large-thickness portion of each workpiece.

For example, if the first and second workpieces W1 and W2 have the same shape and have small- and large-thickness portions in the same distribution, the first workpiece W1 may be placed on the first group of struts 3a, and then the second workpiece W2 may be placed on the second group of struts 3b in such a manner that the orientation of the second workpiece W2 has been rotated about an axis in the top-bottom direction (e.g., by 180 degrees) relative to the first workpiece W1 so as to be in a different orientation therefrom. To do this, the orientation, i.e., amount of rotation, of the second workpiece W2 may be adjusted such that at least part of the large-thickness portion of the first workpiece W1 overlaps at least part of the small-thickness portion of the second workpiece W2 as viewed from above.

A differential-thickness sheet may be, for example, a tailored blank produced by joining steel sheets with different sheet thicknesses with adjacent ends abutting each other. Alternatively, a differential-thickness sheet may be a patchwork-tailored blank produced by joining overlapping steel sheets with different sizes. Alternatively, a differential-thickness sheet may be a tailor-rolled blank made up of one steel sheet with some portions with sheet thicknesses changed through processing, such as rolling.

(Shields)

Figure 11:
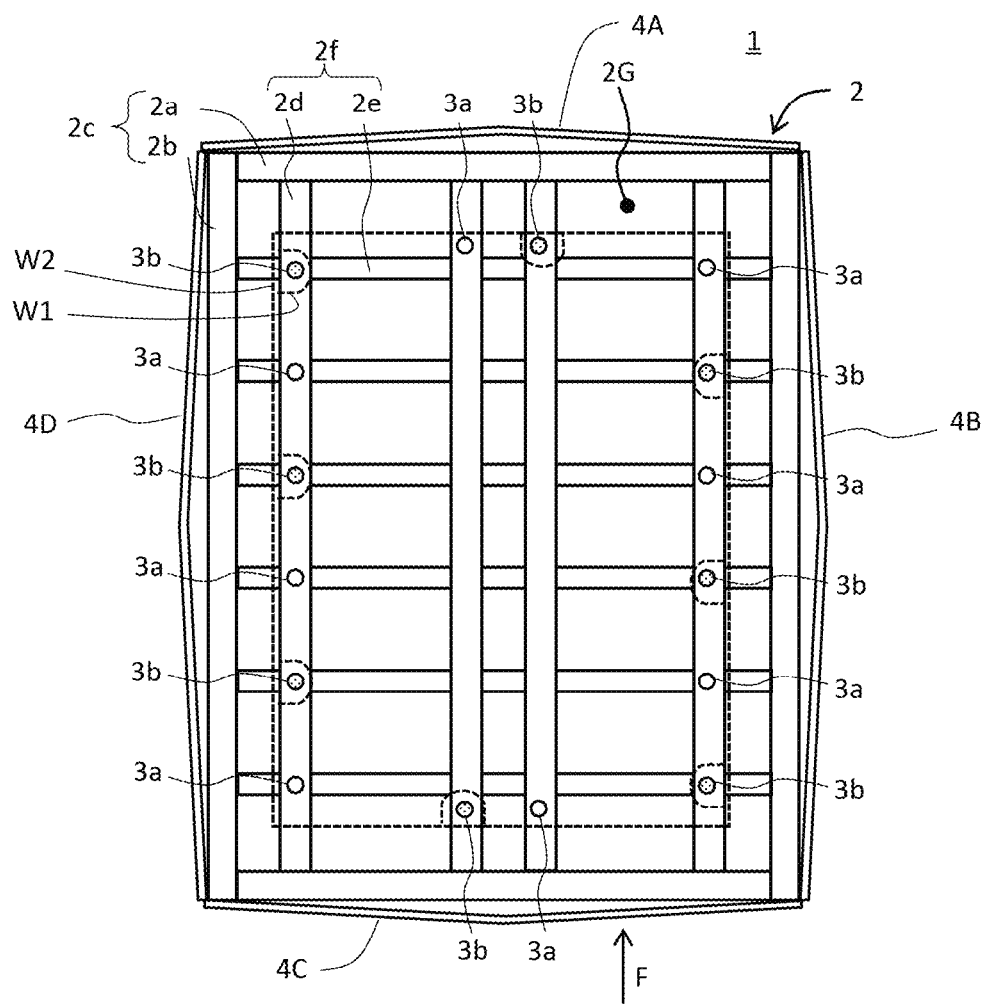
FIG. 11 is a top view of a tray arrangement including shields.
Figure 12:
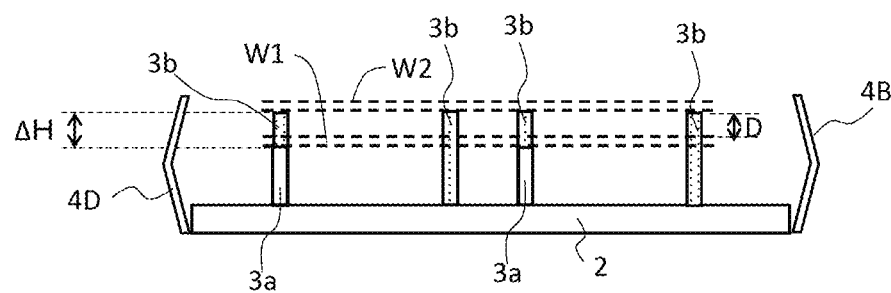
FIG. 12 is a side view of the tray shown in FIG. 11 as viewed in the direction of arrow F.

FIG. 11 is a top view of an exemplary arrangement of the tray 1 including shields 4 (4A to 4D). FIG. 12 is a side view of the tray 1 shown in FIG. 11 as viewed in the direction of arrow F. The tray 1 shown in FIGS. 11 and 12 is the same as the tray 1 shown in FIGS. 1 and 2 except that the shields 4 (4A to 4D) have been added. As shown in FIG. 11, the shields 4A to 4D are provided so as to surround the entire periphery of the tray body 2 as viewed from above. The shields 4 include a pair of shields 4A and 4C covering the tray body 2 along the short-length direction (i.e. short sides) and a pair of shields 4B and 4D covering the tray body along the long-length direction (i.e., long sides) as viewed from above.

As shown in FIG. 12, every one of the shields 4A to 4D covers the height region defined by the heights of the lowest-top strut and the highest-top strut of the first and second groups 3a and 3b from a side (i.e., in a direction perpendicular to the top-bottom direction). That is, the shields 4A to 4D extend from a location lower than the top of the lowest-top strut to a location higher than the top of the highest-top strut. Thus, the shields 4A to 4D prevent outside air from flowing into the space between the first workpiece W1 placed on the first group of struts 3a and the second workpiece W2 placed on the second group of struts 3b.

The shields 4A to 4D are mounted on the tray body 2. In the implementation shown in FIG. 12, the shields 4B and 4D are connected to the sides of the tray body 2 and extend upward. The shields 4 are connected to the tray body 2 by means of fastening members such as welds or bolts, for example. The shields 4 may be detachable from the tray body 2.

In the implementation shown in FIGS. 11 and 12, each of the shields 4A to 4D has an inclined surface inclined so as to be located closer to the struts 3 and thus the first and second workpieces W1 and W2 going from the center to the ends. In other words, each of the shields 4A to 4D is curved in shape such that its central portion protrudes outward and its ends are located inward of the central portion. Thus, outside air that has hit the shields 4 is guided away from the first and second workpieces W1 and W2 placed on the tray. As shown in FIG. 12, the shields 4B and 4D are constructed such that their central portions are located outward of their ends as viewed both from above and from the sides.

It will be understood that the shields 4 are not limited to the above-described shape. For example, the shields 4 may be constituted by flat sheets. The shields may also be shaped such that their central portions are located outward of their ends as viewed either in side view or in plan view.

Also, the positioning of the shields 4 are not limited to the locations shown in FIGS. 11 and 12. In the implementation shown in FIG. 11, shields 4B and 4D covering the workpieces along the long length and shields 4A and 4C covering the workpieces along the short length are provided. In other arrangements, shields 4 may cover the workpieces along at least one of the long length and the short length. Covering the workpieces along the long length with shields 4 prevents air from entering in a wide range. In other arrangements, a shield 4 covers the workpieces at least from the front as determined along the direction of transportation. This prevents outside air from entering during transportation more effectively.

[Exemplary Process for Manufacturing Press-Formed Product]

Returning to FIG. 1, an exemplary process for manufacturing a press-formed product using the above-described hot-press manufacturing line 10 will be described. The process for manufacturing a press-formed product according to an embodiment includes a heating step in which the first and second workpieces W1 and W2 are heated, a transportation step in which the first and second workpieces W1 and W2 are transported, and a pressing step in which the first and second workpieces W1 and W2 are pressed.

(Heating Step)

At the heating step, the first and second workpieces W1 and W2 are heated in the heating device 14 while being placed on the tray 1. For example, as shown in FIGS. 2 to 12, the first workpiece W1 is placed on the first group of struts 3a and the second workpiece W2 is placed on the second group of struts 3b. The first and second workpieces W1 and W2 placed on the tray 1 overlap each other in the top-bottom direction, i.e., direction normal to the sheet surfaces of the first workpiece W1.

The tray body 2 includes empty spaces 2G extending therethrough in the top-bottom direction. Thus, even if a heat source is located below the tray 1, heat transfer from the heat source to the first and second workpieces W1 and W2 is less likely to be prevented by the tray body 2.

The tray 1 with the first and second workpieces W1 and W2 placed thereon enters the heating chamber of the heating device 14 through the inlet 14B. The tray 1 is transported by the in-chamber rollers 13 to the outlet 14A. The heating device 14 heats the first and second workpieces W1 and W2 to a predetermined heating temperature while transporting the workpieces. This heating temperature is, for example, the Ac3 transformation point, at which the ferrite in the steel constituting the first and second workpieces W1 and W2 completes transformation to austenite, or higher.

It will be understood that a transportation device and a manipulator may be provided for placing the first workpiece W1 and then second workpiece W2 on the tray 1 before they enter the heating device 14 such that the workpieces overlap each other. The transportation device places the first workpiece W1 on the first group of struts 3a of the tray 1 and, thereafter, places the second workpiece W2 on the second group of struts 3b. For example, this transportation device may have the same construction as the transportation device 46 for lifting the first and second workpieces W1 and W2 and placing them on the press locations shown in FIG. 1. This transportation device is located upstream of the heating device 14.

(First Transportation Sub-Step)

At a first transportation sub-step, the first and second workpieces W1 and W2 exit the heating device 14 while being placed on the tray 1, and are transported to a location where they are handed to the transportation device 46, i.e., lifting location. Thus, the workpieces, together with the tray 1, are transported from the heating device 14 to the lifting location while the first workpiece W1 is placed on the first group of struts 3a and the second workpiece W2 is placed on the second group of struts 3b and overlaps the first workpiece W1, located above it. Outside the heating device 14, the tray 1 is transported by the transportation rollers 26 to near the press machine 20. For example, as illustrated by FIGS. 2 to 12, the first and second workpieces W1 and W2 are placed on the tray 1 and transported from the heating device 14 to the lifting location. The positional relationship between the first and second workpieces W1 and W2 at the first transportation sub-step is the same as their positional relationship at the heating step. That is, the tray 1 makes it possible to transport the first and second workpieces W1 and W2 to the lifting location at the first transportation sub-step while retaining the positional relationship between the first and second workpieces W1 and W2 during heating. This reduces temperature drop in the first and second workpieces W1 and W2 during transportation. Further, temperature drop in the workpieces during transportation is reduced even without providing a heat source, such as a heater, on the transportation path to generate heat energy. Thus, temperature drop is reduced in a simple manner.

It will be understood that, after the first and second workpieces W1 and W2 have been lifted by the transportation device 46 and transported to the press locations, the tray 1 may be used for the heating and transportation sub-steps for other workpieces.

(Second Transportation Sub-Step)

At a second transportation sub-step, near the press machine 20, the second workpiece W2 placed on the second group of struts 3b is lifted upward by the transportation device 46 and, thereafter, the first workpiece W1 placed on the first group of struts 3a is lifted by the transportation device 46. As discussed above, the transportation device 46 moves the first workpiece W1 upward while holding the workpiece with the arms 71. The first workpiece W1 moves upward while remaining in the same attitude as when being placed on the first group of struts 3a. At this time, the first workpiece W1 being lifted upward by the transportation device 46 does not get snagged on the second group of struts 3b, since the second group of struts do not overlap the first workpiece W1 placed on the first group of struts 3a as viewed from above. This simplifies the control or device configuration for lifting the first workpiece W1.

It will be understood that the transportation device for lifting the second workpiece W2 and the transportation device for lifting the first workpiece W1 need not necessarily be the same device. The first and second workpieces W1 and W2 lifted by the transportation device 46 are set on their respective press locations. The press locations are between the upper die part 21 and lower die part 23 of the press machine 20, for example.

The first and second workpieces W1 and W2 may be set on the same press location, or on different press locations. Further, the first and second workpieces W1 and W2 may be set on different locations in the die of a single press machine 20. Alternatively, two press machines 20 may be provided. In such implementations, the first workpiece W1 may be set in the die of one of the two press machines 20, whereas the second workpiece W2 may be set in the die of the other press machine.

(Pressing Step)

The press machine 20 press-forms the first and second workpieces W1 and W2 using the upper and lower die parts 21 and 23. The first and second workpieces W1 and W2 being press-formed here have been heated by the heating device 14 to the Ac3 transformation point or higher and then transported to the press locations by the transportation table 16 and transportation device 46. The press machine 20 begins press-forming the first and second workpieces W1 and W2 using the upper and lower die parts 21 and 23 to perform forming and quenching at the same time. Specifically, with the first and second workpieces W1 and W2 being positioned between the upper and lower die parts 21 and 23, the press machine 20 moves the upper and lower die parts 21 and 23 closer to each other until the die reaches the bottom-dead point to form the workpieces. After the die has reached the bottom-dead point, the upper and lower die parts 21 and 23, while being die-tightened, are in contact with the first and second workpieces W1 and W2 to rapidly remove heat from the first and second workpieces W1 and W2. This causes martensite transformation or bainite transformation of the first and second workpieces W1 and W2. As a result, the first and second workpieces W1 and W2 are made into formed products that have been shaped to conform to the upper and lower die parts 21 and 23 and quenched.

The present invention is not limited to the above-described embodiments. For example, although the above-described embodiments describe implementations with two workpieces (i.e., first and second workpieces W1 and W2) placed on the tray 1 while overlapping each other in the top-bottom direction, three or more workpieces may be placed on the tray 1 while overlapping one another in the top-bottom direction.

[Material of Workpieces]

The material of a workpiece may be any formable metal. Although not limiting, examples of materials for a workpiece include Fe-based materials such as carbon steel or stainless steel, and Al-based and Ti-based materials. Further, the workpiece may include a plating layer. For example, the workpiece may be a plated steel sheet. The plating layer may be a plating layer of, for example, an aluminum alloy, an aluminum-based alloy, a zinc alloy, or a zinc-based alloy.

A workpiece constituted by a plated steel sheet is preferable in that oxide scale is not easily produced during transportation. If two workpieces W1 and W2 overlapping in the top-bottom direction are transported on the tray 1 and, during this, oxide scale is formed on the lower surface of the upper second workpiece W2, this oxide scale may peel off and drop onto the upper surface of the lower first workpiece W1. Further, oxide scale formed on the lower surface of the lower first workpiece W1 may peel off, too. In such cases, the difference between the amounts of oxide scale adhering to the upper and lower surfaces of the lower first workpiece W1 may be larger than the corresponding difference for the upper second workpiece W2. A difference in the amount of adhering scale may lead to differences in frictional characteristics of the die and workpiece surface during press-forming. As a result, separate adjustments to the die and separate settings of forming conditions may be needed for each workpiece. If the workpiece is a plated steel sheet, oxide scale formed during transportation can be reduced, thereby reducing variations in characteristics of workpieces.

[Effects of Transportation of Plurality of Workpieces Separated with Distance]

In the above-described implementations, first and second workpieces W1 and W2 on the tray 1, separated in the top-bottom direction and overlapping each other, are transported. This reduces variations in characteristics of a workpiece as represented by the differences between the upper and lower surfaces, and variations in characteristics of the upper and lower surfaces as represented by the differences between the upper and lower workpieces.

If the first and second workpieces W1 and W2 overlapping with no clearance therebetween are transported, the overlying surfaces of the workpieces, on the one hand, and the opposite surfaces of the workpieces, on the other, are in contact with air for different periods of time. In such cases, if the first and second workpieces W1 and W2 are non-plated sheets, the upper and lower surfaces of each workpiece may develop different amounts of oxide scale. If the upper and lower surfaces have different amounts of oxide scale, the upper and lower surfaces may have different frictional characteristics. Further, the overlying surface and the opposite surface of the first workpiece W1 are in reversed up-down orientations compared with those of the second workpiece W2; thus, the first and second workpieces W1 and W2 themselves may have different frictional characteristics. As a result, adjustments to the die and settings of forming conditions for press-forming may require increased time. Further, if first and second workpieces W1 and W2 that are sheeted steel sheets are heated at the heating step while overlapping each other without a clearance between the workpieces, the overlying surface and the opposite surface of each workpiece may experience different rates of temperature increase, potentially causing differences in temperature history. If this is the case, the upper and lower surfaces of each workpiece may experience differences in the alloying of the plating and base material, potentially causing differences in the quality of the plating. In view of this, the first and second workpieces W1 and W2 are separated by a distance while being heated and transported to reduce variations in characteristics, such as frictional characteristics and plating quality, of the upper and lower surfaces of the workpieces.

[Variations of Hot-Press Manufacturing Line]

Figure 13:
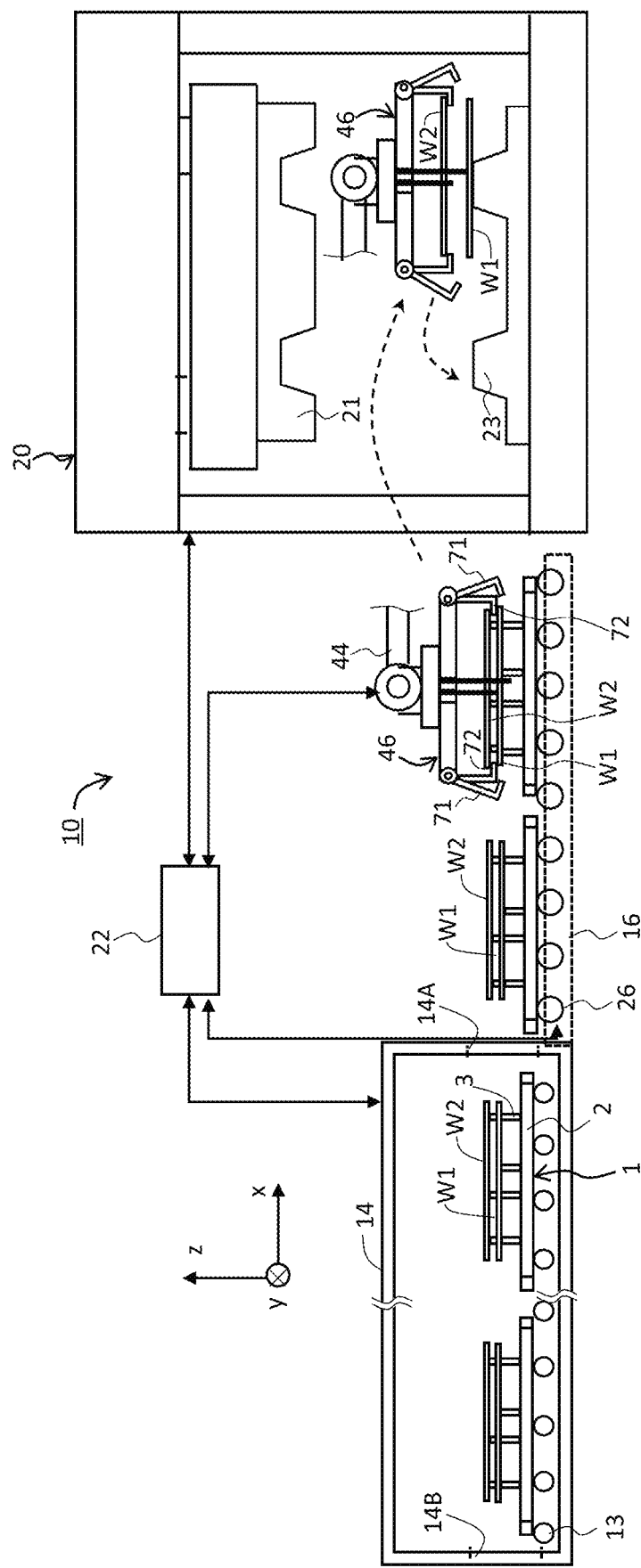
FIG. 13 shows a variation of the hot-press manufacturing line of the embodiments.

FIG. 13 shows a variation of the hot-press manufacturing line 10. The hot-press manufacturing line 10 shown in FIG. 13 includes a heating device 14, a transportation table 16, a manipulator 44, a transportation device 46, a press machine 20, and a controller 22. The hot-press manufacturing line 10 of FIG. 13 may have the same configuration as in FIG. 1 except for the transportation device 46.

(Transportation Device)

Figure 14A:
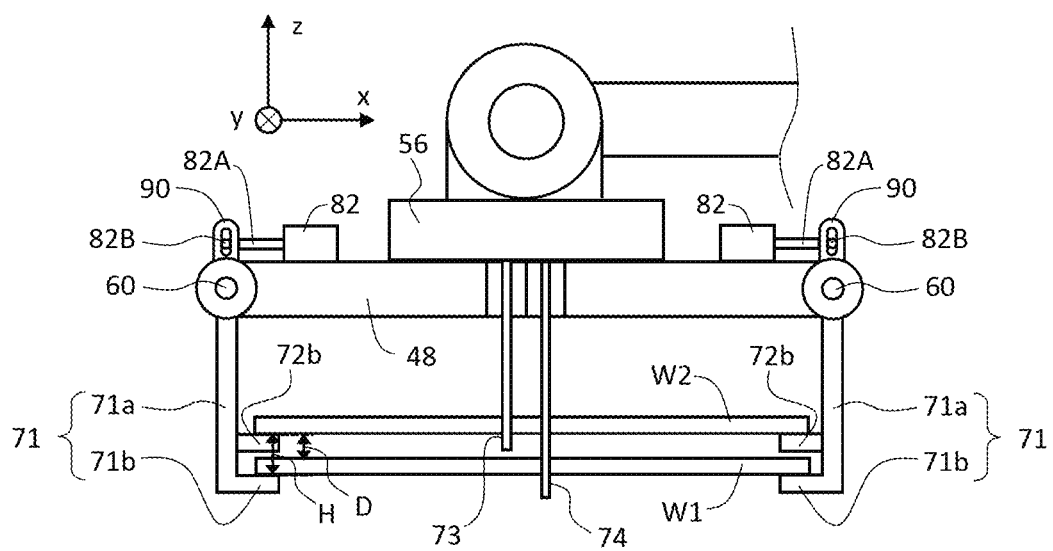
FIG. 14A illustrates a construction of the transportation device shown in FIG. 13.
Figure 14B:
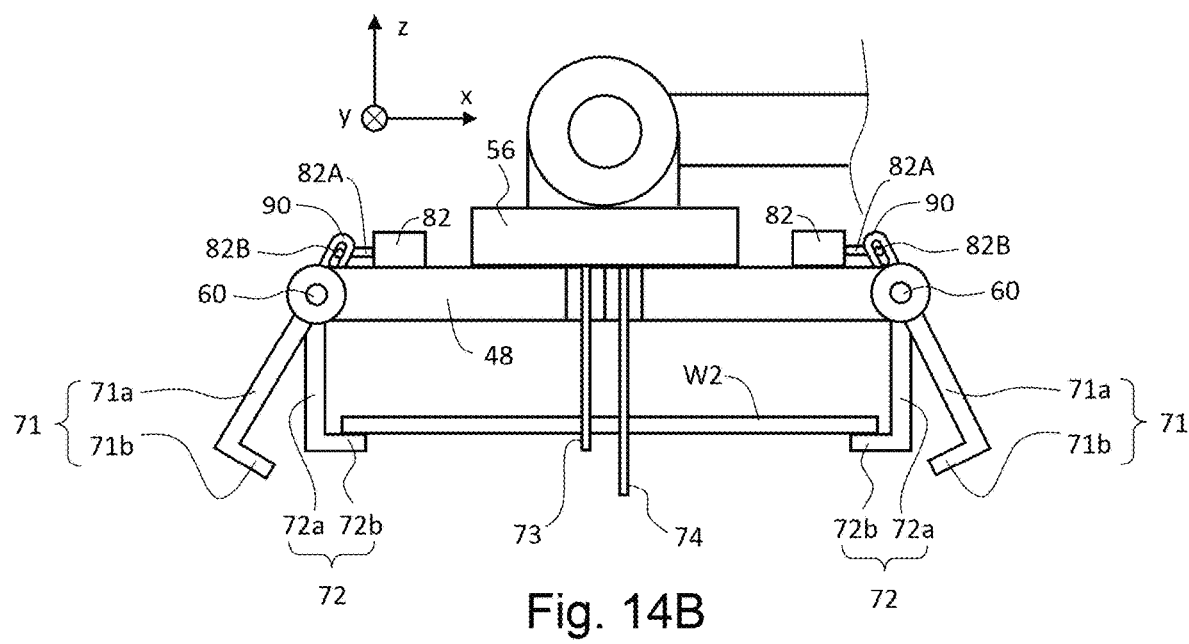
FIG. 14B shows the transportation device shown in FIG. 14A with its first arms opened.

FIG. 14A is a side view of the transportation device 46 of FIG. 13 as viewed from a side (y-direction) illustrating an exemplary construction. FIG. 14B shows the transportation device 46 of FIG. 14A with its first arms 71 opened outwardly.

(Base Frame)

In the implementation shown in FIGS. 14A and 14B, the transportation device 46 includes a base frame 48, as well as a pair of first arms 71 and a pair of second arms 72 rotatably mounted on the base frames 48. The shape of the base frame 48 is rectangular when viewed from above. In the present implementation, the top-bottom direction represents the z-direction. A lateral direction is a direction in a plane perpendicular to the top-bottom direction. Lateral directions include the long-length direction of the base frame 48, i.e., y-direction, and the short-length direction, i.e., x-direction.

A joint 56 is provided on the upper surface of the base frame 48 to be connected to the manipulator 44. The joint 56 is connected to the manipulator such that the base frame 48 is rotatable, about an axis in the top-bottom direction, relative to the manipulator 44.

(First and Second Arms)

The pair of first arms 71 are separated from each other in a lateral direction (x-direction). Each of the first arms 71 includes a first base 71a extending from the base frame 48 in the top-bottom direction, and a first claw 71b extending, with a bend, from the first base 71a in the lateral direction. Each first arm 71 is mounted on the base frame 48 so as to be rotatable about an axis of rotation 60 in the y-direction. One end of the first base 71a is rotatably connected to the base frame 48, while the first claw 71b extends from the other end.

The pair of second arms 72 are separated from each other in a lateral direction (x-direction). Each of the second arms 72 includes a second base 72a extending from the base frame 48 in the top-bottom direction, and a second claw 72b extending, with a bend, from the second base 72a in the lateral direction. Each second arm 72 is mounted on the base frame 48 so as to be rotatable about an axis of rotation 60 in the y-direction. One end of the second base 72a is rotatably connected to the base frame 48, while the second claw 72b extends from the other end.

The location of the pair of first claws 71b in the top-bottom direction and the location of the pair of second claws 72b in the top-bottom direction are different from each other. In the implementation shown in FIGS. 14A and 14B, the first bases 71a are longer than the second bases 72a as measured in the top-bottom direction. The first claws 71b are located more distant from the base frame 48 than the second claws 72b are.

In the implementation shown in FIGS. 14A and 14B, the axis of rotation 60 of each first arm 71 is coaxial with the axis of rotation 60 of the associated second arm 72. This allows the first and second arms 71 and 72 to be efficiently positioned on the base frame 48. Alternatively, the axis of rotation 60 of each first arm 71 and the axis of rotation 60 of the associated second arm 72 may not be coaxial.

(Drive Units)

The pair of first arms 71 are driven by a first drive unit. The first drive unit rotates the pair of first arms 71 relative to the base frame 48 to change the distance between the first claws 71b in a lateral direction (x-direction). In the implementation shown in FIGS. 14A and 14B, the first drive unit is constituted by actuators 82 provided for the respective first arms 71.

An actuator 82 may be an air cylinder, for example. The actuator 82 adjusts the amount of extension of an actuation shaft 82A that moves in the axial direction. A pin 82B is provided on the distal end of the actuation shaft 82A. The pin 82B is inserted into a slot in a link 90 fixed to the associated first arm 71 so as to be movable and rotatable.

When each actuator 82 extends its actuation shaft 82A, the associated first arm 71 extends downwardly, as shown in FIG. 14A, such that the pair of first claws 71b of the pair of first arms 71 are located closer to each other, i.e., in a closed state. When each actuator 82 retracts its actuation shaft 82A, the pair of first claws 71b of the pair of first arms 71 move away from each other, as shown in FIG. 14B, such that they are in an open state.

The pair of second arms 72 are driven by a second drive unit (not shown). The second drive unit rotates the pair of second arms 72 relative to the base frame 48 to change the distance between the second claws 72b in a lateral direction (x-direction). The second drive unit that drives the second arms 72 may be an arrangement including actuators similar to the actuators 82 shown in FIGS. 14A and 14B, for example. The pair of second arms 72 are controlled by the second drive unit to be, again, in a closed state, in which the pair of second claws 72b are located closer to each other, or in an open state, in which the pair of second claws 72b are more distant from each other than in the closed state. It will be understood that the actuators of the first and second drive units are not limited to air cylinders, and may be motors or hydraulic cylinders, for example.

The pair of first claws 71b are capable of supporting the lower surface of the first workpiece W1 at both ends as determined along the lateral direction when they are laterally closer to each other, i.e., in the closed state. The pair of second claws 72b are capable of supporting the lower surface of the second workpiece W2 at both ends as determined along the lateral direction when they are laterally closer to each other, i.e., in the closed state.

[Exemplary Process for Manufacturing Press-Formed Product]

An exemplary process for manufacturing a press-formed product using the hot-press manufacturing line 10 shown in FIG. 13 will be described. The process for manufacturing a press-formed product includes a heating step, a first transportation step, a second transportation step, and a pressing step. The heating step and the first transportation step may be the same as in the manufacturing process of the hot-press manufacturing line 10 shown in FIG. 1.

(Heating Step)

At the heating step, the first and second workpieces W1 and W2 are heated by the heating device 14 while being placed on the tray body 2. The first and second workpieces W1 and W2 are heated while overlapping in the direction normal to the sheet surfaces of the first workpiece W1. The first workpiece W1 is placed on the first group of struts 3a. The second workpiece W2 is placed on the second group of struts 3b.

(First Transportation Step)

At the first transportation step, the first and second workpieces W1 and W2, while being on the tray body 2, are transported by the transportation table 16 from the heating device 14 to the lifting location for the transportation device 46.

(Second Transportation Step)

The second transportation step includes: a sub-step in which the transportation device 46 simultaneously lifts the first and second workpieces W1 and W2; a sub-step in which the first and second workpieces W1 and W2 are transported; a sub-step in which the first workpiece W1 is lowered to a press location; and a sub-step in which the second workpiece W2 is lowered to a press location.

As the manipulator 44 operates, the transportation device 46 moves toward the first and second workpieces W1 and W2 on the tray 1 from above. At this moment, the transportation device 46 has the pair of first arms 71 and the pair of second arms 72 in the open state. The transportation device 46 moves toward the second workpiece W2 from above, with the second workpiece W2 on the second group of struts 3b located between the second arms 72 as viewed from above. When the transportation device 46 has moved close enough to allow the second claws 72b of the second arms 72 to "dive" to below the second workpieces W2 placed on the second group of struts 3b, the device rotates the pair of second arms 72 into the closed state. This allows the second claws 72b of the pair of second arms 72 to dive to below the lower surface of the second workpiece W2 at both ends. The transportation device 46 is now supporting the lower surface of the second workpiece W2 using the second claws 72b of the second arms 72. FIGS. 13 and 14B show that the transportation device 46 are supporting the second workpiece W2 using the second arms 72.

The transportation device 46, while supporting the second workpiece W2 with the second arms 72, rotates the first arms 71 into the closed state. This allows the first claws 71b of the pair of first arms 71 to dive to below the lower surface of first workpiece W1 at both ends. The transportation device 46 is now supporting the lower surface of the first workpiece W1 using the first claws 71b of the first arms 71. In this state, the transportation device 46 moves upward as the manipulator 44 operates. Thus, the first and second workpieces W1 and W2 are lifted simultaneously. Although in this implementation the second arms 72's operation of rotating and supporting the first workpiece W2 and the first arms 71's operation of rotating and supporting the first workpiece W1 occur successively, these operations may occur simultaneously, or may occur in the reversed order.

The transportation device 46 transports the workpieces while the first workpiece W1 with its lower surface supported by the claws of the pair of first arms 71 and the second workpiece W2 with its lower surface supported by the claws of the pair of second arms 72 overlap each other in the direction normal to the sheet surfaces of the first workpiece W1.

FIG. 13 shows a situation immediately after the transportation device 46 has placed the first workpiece W1 on its press location. To place the first workpiece W1, the transportation device 46, while supporting the first workpiece W1 with the claws of the pair of first arms 71 (i.e., first claws 71b), places it on the press location for the first workpiece W1 and, at this location, rotates the first arms 71 into the open state. When placing the first workpiece W1, the transportation device 46 is continuing to hold the second workpiece W2 with the second arms 72. Thereafter, the transportation device 46 moves to the press location for the second workpiece W2, drives the pair of second arms 72 into the open state, and places the second workpiece W2 on its press location.

In the implementation shown in FIG. 13, two workpieces are positioned between the upper and lower die parts 21 and 23 of a single press machine and the two workpieces are press-formed simultaneously. In this implementation, the first and second workpieces W1 and W2 are lowered onto different press locations between the upper and lower die parts 21 and 23. The lowering of the two workpieces held by the transportation device 46 onto their respective press locations is not limited to this manner. For example, the press locations may be provided in two different press machines, where the first and second workpieces W1 and W2 are lowered onto their respective press locations.

[Experiment]

Figure 15:
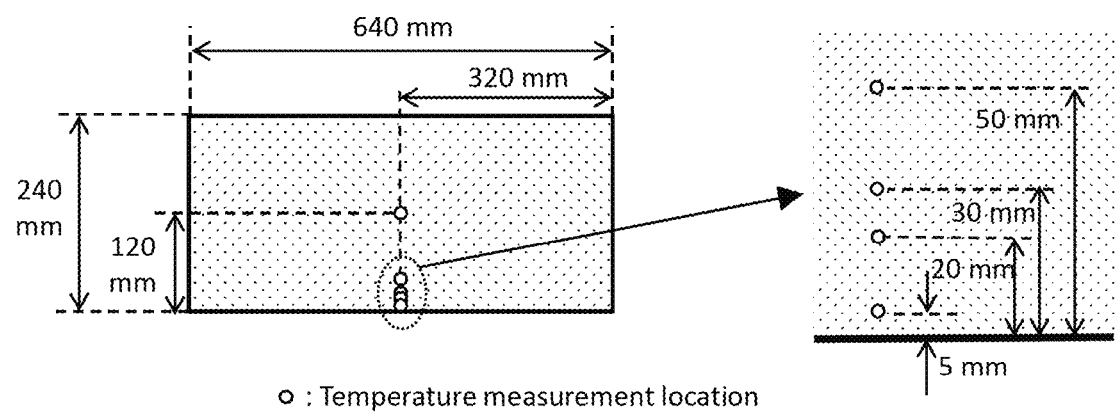
FIG. 15 indicates locations at which temperature is measured in the examples.

A steel sheet was heated and temperature changes after completion of heating were measured under various conditions. Specifically, the experiment was conducted as follows: The samples used were steel sheets for hot pressing of the order of 1.5 GPa having a sheet thickness of 0.8 mm or 1.6 mm, and temperature was measured by thermocouples attached to a surface of the steel sheet. The steel sheet was heated in a heating furnace to 950° C., and temperature drop after removal from the heating furnace and during air cooing was measured. For Comparative Example 1, temperature was measured where a single steel sheet with a sheet thickness of 1.6 mm was heated alone and left to cool; for Comparative Example 2, a single steel sheet with a sheet thickness of 0.8 mm was heated alone and left to cool; for the inventive examples, two steel sheets with a sheet thickness of 0.8 mm were positioned to overlap each other in the direction normal to the sheet surfaces and fixedly arranged with a predetermined distance D. Three values of the distance D between the two overlapping steel sheets were used: 10 mm, 30 mm, and 50 mm, which provided Inventive Example 1, Inventive Example 2, and Inventive Example 3, respectively. FIG. 15 indicates locations at which temperature was measured. The temperature of each of the upper and lower steel sheets was measured at positions of 5 mm, 20 mm, 30 mm, and 50 mm away from an edge of the steel sheet, and at the center of the steel sheet.

Figure 16:
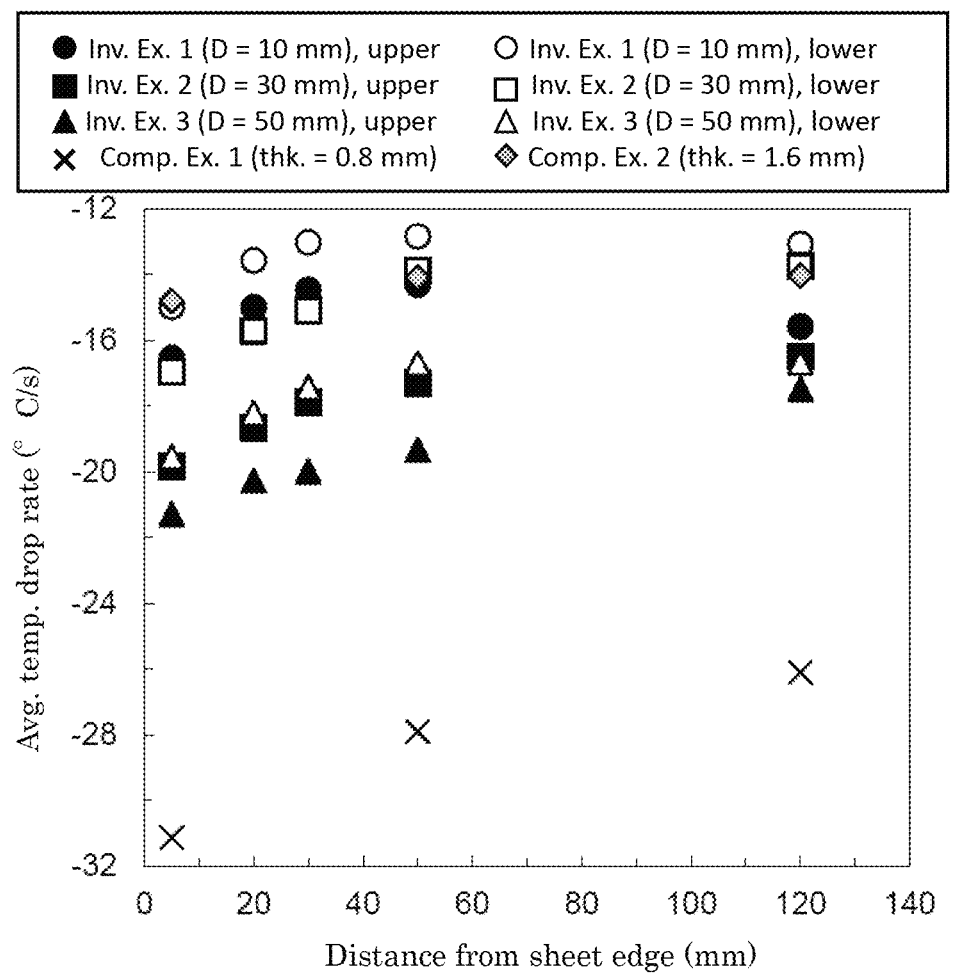
FIG. 16 is a graph of measurements of average temperature drop rate.
Figure 17:
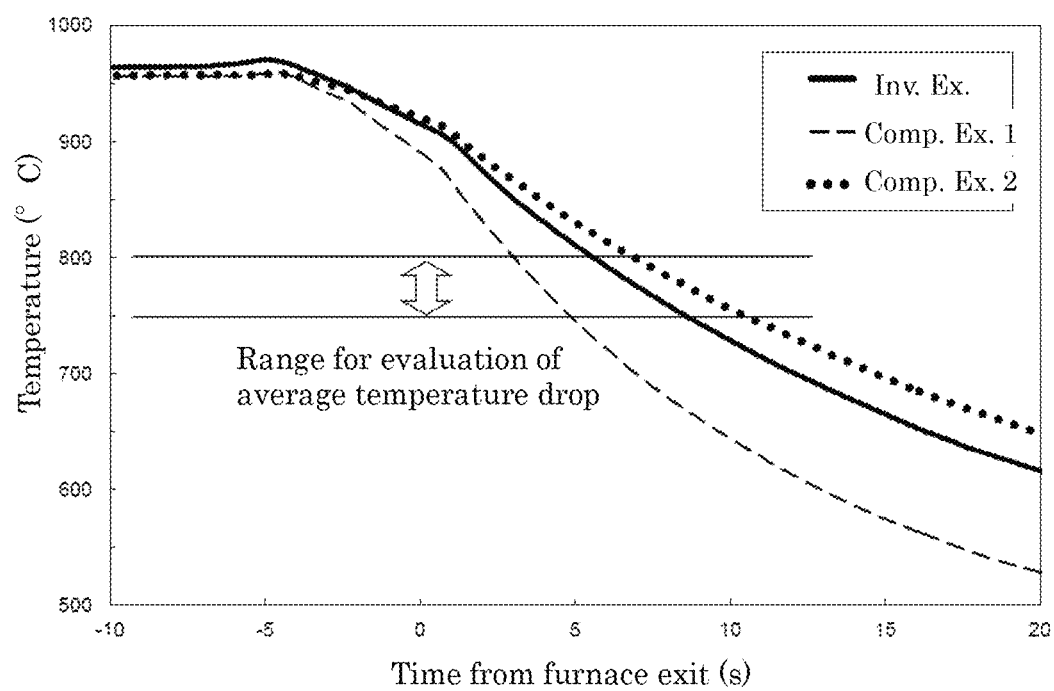
FIG. 17 is a graph indicating the range from which the average temperature drop rates were derived.

FIG. 16 is a graph of measurements of average temperature drop rate. The average temperature drop rate was derived across the section for 800° C. to 750° C. along the temperature drop curve from measurements. FIG. 17 is a graph indicating the range from which the average temperature drop rates were derived. The results shown in FIG. 16 demonstrate that, for all the measurement locations, the average temperature drop rates for Inventive Examples 1 to 3, which had two steel sheets overlapping in the top-bottom direction with a sheet thickness of 0.8 mm, were lower than that for Comparative Example 1, which had a single steel sheet with a sheet thickness of 0.8 mm. The results also demonstrate that, with two overlapping steel sheets, examples with lower values of the distance D between the two steel sheets achieved lower average temperature drop rates near the edges of the steel sheets and achieved greater improvements in average temperature drop rate for all the measurement locations. Experiment 3, which had a distance D of 50 mm, improved the temperature drop rate to an extent approximately in the middle between that for Comparative Example 1, which had a single steel sheet with a sheet thickness of 0.8 mm, and that for Comparative Example 2, which had a single steel sheet with a sheet thickness of 1.6 mm. Inventive Example 1, which had a distance D of 10 mm, improved the temperature drop rate to an extent substantially equal to that of Comparative Example 2, which had a single steel sheet with a sheet thickness of 1.6 mm. Setting an appropriate distance D between the two overlapping steel sheets achieved temperature-drop characteristics substantially equal to those of a steel sheet with a sheet thickness that was twice as large, i.e., with a heat capacity that was twice as high.

These results show that, when a plurality of workpieces are transported while overlapping in the top-bottom direction, keeping the workpieces at an appropriate distance is important to reduce temperature drop rate. The above-described embodiments enable retaining the distance between the first and second workpieces placed on the tray in a stable manner during the heating step and the subsequent transportation step. This will reduce temperature drop in the first and second workpieces and, at the same time, enable simple and efficient transportation.

REFERENCE SIGNS LIST

1: tray
2: tray body
3: struts
3$a$: first group of struts
3$b$: second group of struts
W1: first workpiece
W2: second workpiece

The invention claimed is:

1. A method of manufacturing a press-formed product comprising:
a heating step in which a sheet-shaped first workpiece and a sheet-shaped second workpiece are simultaneously heated;
a transportation step in which the first workpiece and the second workpiece heated at the heating step are transported to a press machine; and
a pressing step in which the first workpiece and the second workpiece transported to the press machine are processed by the press machine,
wherein, at the heating step, the first workpiece and the second workpiece are heated by a heating device while the first workpiece is placed on a first group of at least three struts extending upward from a tray body having an empty space extending therethrough in a top-bottom direction when viewed from above and the second workpiece is placed on a second group of at least three struts extending upward from the tray body and positioned above the first workpiece to overlap the first workpiece in a direction normal to a sheet surface of the first workpiece,
wherein the transportation step includes:
a first transportation sub-step in which the first workpiece and the second workpiece, together with the tray body, are transported from the heating device to a lifting location while the first workpiece is placed on the first group of struts and the second workpiece is placed on the second group of struts and positioned above the first workpiece to overlap the first workpiece in the direction normal to the sheet surface of the first workpiece; and
a second transportation sub-step in which the second workpiece placed on the second group of struts, when at the lifting location, is lifted upward by a transportation device and transported to a press location for the second workpiece, and the first workpiece placed on the first group of struts, when at the lifting location, is lifted upward by the transportation device and transported to a press location for the first workpiece.

2. The method of manufacturing the press-formed product according to claim 1, wherein, at the heating step and the first transportation sub-step, the first workpiece placed on the first group of struts and the second workpiece placed on the second group of struts are positioned to overlap in the top-bottom direction so as to be separated by a distance not larger than 100 mm.

3. The method of manufacturing the press-formed product according to claim 1, wherein, at the heating step and the first transportation sub-step, a relationship between a maximum distance D (mm) between the first workpiece placed on the first group of struts and the second workpiece placed on the second group of struts as measured in the top-bottom direction and a minimum sheet thickness t (mm) of a thinnest portion of the first workpiece and the second workpiece is represented by an expression:

$$D \leq 120t.$$

4. The method of manufacturing the press-formed product according to claim 1, wherein:
an area of a sheet surface of the second workpiece is larger than an area of the sheet surface of the first workpiece; and,
at the heating step and the first transportation sub-step, the first workpiece in an entirety placed on the first group of struts and the second workpiece placed on the second group of struts overlap in the top-bottom direction.

5. The method of manufacturing the press-formed product according to claim 4, wherein, at the heating step and the first transportation sub-step, a minimum value of a distance $\Delta W$ between an edge of the second workpiece placed on the second group of struts as viewed from above and an edge of the first workpiece placed on the first group of struts as viewed from above is not smaller than 5 mm.

6. The method of manufacturing the press-formed product according to claim 4, wherein, at the heating step and the first transportation sub-step, a maximum value of a distance $\Delta W$ between an edge of the second workpiece placed on the second group of struts as viewed from above and an edge of the first workpiece placed on the first group of struts as viewed from above is not larger than 30 mm.

7. The method of manufacturing the press-formed product according to claim 1, wherein a sheet thickness of the second workpiece is larger than a sheet thickness of the first workpiece.

8. The method of manufacturing the press-formed product according to claim 1, wherein, at the first transportation sub-step, the first workpiece placed on the first group of struts and the second workpiece placed on the second group of struts are transported while being covered with a shield from a front as determined along a direction of transportation.

9. The method of manufacturing the press-formed product according to claim 8, wherein the shield includes an inclined surface inclined from a center of the shield toward an end of the shield so as to be located closer to the first workpiece and the second.

10. The method of manufacturing the press-formed product according to claim 8, wherein:
   at least one of the first workpiece placed on the first group of struts and the second workpiece placed on the second group of struts has a long-length direction and a short-length direction; and, at the first transportation sub-step, the shield covers the first workpiece placed on the first group of struts and the second workpiece placed on the second group of struts along the long-length direction.

11. The method of manufacturing the press-formed product according to claim 1, wherein:
   each of the first workpiece and the second workpiece is a differential-thickness sheet with a large-thickness portion and a small-thickness portion; and,
   at the heating step and the first transportation sub-step, the large-thickness portion of the first workpiece placed on the first group of struts overlaps, as viewed in the top-bottom direction, the small-thickness portion of the second workpiece placed on the second group of struts.

\* \* \* \* \*